US011971004B2

(12) United States Patent
Felton et al.

(10) Patent No.: US 11,971,004 B2
(45) Date of Patent: Apr. 30, 2024

(54) ADJUSTABLE FINS ON A TURBINE

(71) Applicant: Schlumberger Technology Corporation, Sugar Land, TX (US)

(72) Inventors: Annabel Felton, Stonehouse (GB); Ian Sheppard, Stonehouse (GB); Edward Richards, Stonehouse (GB); Paul Linford, Stonehouse (GB); Alexander Hickson, Stonehouse (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 18/048,180

(22) Filed: Oct. 20, 2022

(65) Prior Publication Data

US 2023/0131841 A1 Apr. 27, 2023

Related U.S. Application Data

(60) Provisional application No. 63/262,814, filed on Oct. 21, 2021.

(51) Int. Cl.

*F03B 13/02* (2006.01)
*E21B 4/02* (2006.01)
*E21B 41/00* (2006.01)

(52) U.S. Cl.

CPC ................ *F03B 13/02* (2013.01); *E21B 4/02* (2013.01); *E21B 41/0085* (2013.01); *F05B 2240/311* (2013.01); *F05B 2270/1032* (2013.01); *F05B 2280/5001* (2013.01)

(58) Field of Classification Search

CPC ................ F03B 13/02; F05B 2240/311; F05B 2270/1032; F05B 2280/5001; E21B 4/02; E21B 41/0085

See application file for complete search history.

(56) References Cited

U.S. PATENT DOCUMENTS 3,614,260 A * 10/1971 Ellinger .................. F01D 5/148 416/240
5,851,131 A * 12/1998 Bergeron ................. B63H 1/20 416/140
6,763,899 B1 7/2004 Ossia et al.
2009/0229883 A1* 9/2009 Hall ........................ E21B 47/16 175/107
2012/0201659 A1* 8/2012 Savage ................... F04D 13/10 415/143
2014/0262524 A1* 9/2014 Valliyappan ............ F03B 13/02 175/57
2017/0241242 A1* 8/2017 Marshall .................. F01C 1/34

* cited by examiner

*Primary Examiner* — Brad Harcourt
(74) *Attorney, Agent, or Firm* — Jeffrey D. Frantz

(57) ABSTRACT

A downhole turbine includes a plurality of fins. The plurality of fins have an exit angle that exerts a tangential force on the fin, which imparts a torque on a hub. The fins have an adjustable exit angle that changes in response to changes in the properties of a drilling fluid. The changing exit angle changes the tangential force, which changes the torque on the hub.

19 Claims, 15 Drawing Sheets

ADJUSTABLE FINS ON A TURBINE

CROSS-REFERENCE TO RELATED APPLICATIONS

This application claims the benefit of, and priority to, U.S. Patent Application No. 63/262,814, filed Oct. 21, 2021, which application is expressly incorporated herein by this reference in its entirety.

BACKGROUND

Wellbores may be drilled into a surface location or seabed for a variety of exploratory or extraction purposes. For example, a wellbore may be drilled to access fluids, such as liquid and gaseous hydrocarbons, stored in subterranean formations and to extract the fluids from the formations. Wellbores used to produce or extract fluids may be lined with casing around the walls of the wellbore. A variety of drilling methods may be utilized depending partly on the characteristics of the formation through which the wellbore is drilled.

The wellbores may be drilled by a drilling system that drills through earthen material downward from the surface. Some wellbores are drilled vertically downward, and some wellbores have one or more curves in the wellbore to follow desirable geological formations, avoid problematic geological formations, or a combination of the two.

SUMMARY

In some embodiments, a downhole turbine includes a hub having an outer surface. A fin is located on the outer surface of the hub. The fin is changeable between a first exit angle and a second exit angle.

In other embodiments, a downhole turbine includes a hub and a fin connected to the hub. The fin includes a leading edge fixed to the hub and a tip movable relative to the hub.

In yet other embodiments, a method for regulating torque include flowing a fluid across a fin. The fluid includes a fluid property and the fin is connected to a hub and has a first exit angle. The hub is rotated with a first torque based at least in part on the first exit angle. The first exit angle may be changed to a second exit angle in response to changing the fluid property. The hub may be rotated with a second torque based at least in part on the second exit angle.

This summary is provided to introduce a selection of concepts that are further described below in the detailed description. This summary is not intended to identify key or essential features of the claimed subject matter, nor is it intended to be used as an aid in limiting the scope of the claimed subject matter.

Additional features and advantages of embodiments of the disclosure will be set forth in the description which follows, and in part will be obvious from the description, or may be learned by the practice of such embodiments. The features and advantages of such embodiments may be realized and obtained by means of the instruments and combinations particularly pointed out in the appended claims. These and other features will become more fully apparent from the following description and appended claims, or may be learned by the practice of such embodiments as set forth hereinafter.

BRIEF DESCRIPTION OF THE DRAWINGS

In order to describe the manner in which the above-recited and other features of the disclosure can be obtained, a more particular description will be rendered by reference to specific embodiments thereof which are illustrated in the appended drawings. For better understanding, the like elements have been designated by like reference numbers throughout the various accompanying figures. While some of the drawings may be schematic or exaggerated representations of concepts, at least some of the drawings may be drawn to scale. Understanding that the drawings depict some example embodiments, the embodiments will be described and explained with additional specificity and detail through the use of the accompanying drawings in which:

FIG. 3-1 is a schematic representation of a fin, according to at least one embodiment of the present disclosure;

FIG. 3-2 is another schematic representation of a fin, according to at least one embodiment of the present disclosure;

FIG. 5-1 is a graph representing the relationship between exit angle and torque, according to at least one embodiment of the present disclosure;

FIG. 5-2 is a graph representing the relationship between exit angle and a fluid property, according to at least one embodiment of the present disclosure;

FIG. 5-3 is a graph representing the relationship between deflection and elasticity, according to at least one embodiment of the present disclosure;

FIG. 7-1 is a perspective view of a downhole turbine, according to at least one embodiment of the present disclosure;

FIG. 7-2 is a perspective view of a fin from the downhole turbine of FIG. 7-1, according to at least one embodiment of the present disclosure;

FIG. 8-1 is a side view of a downhole turbine, according to at least one embodiment of the present disclosure;

FIG. 8-2 is another side view of the downhole turbine of FIG. 8-1, according to at least one embodiment of the present disclosure;

and

Figure 10:
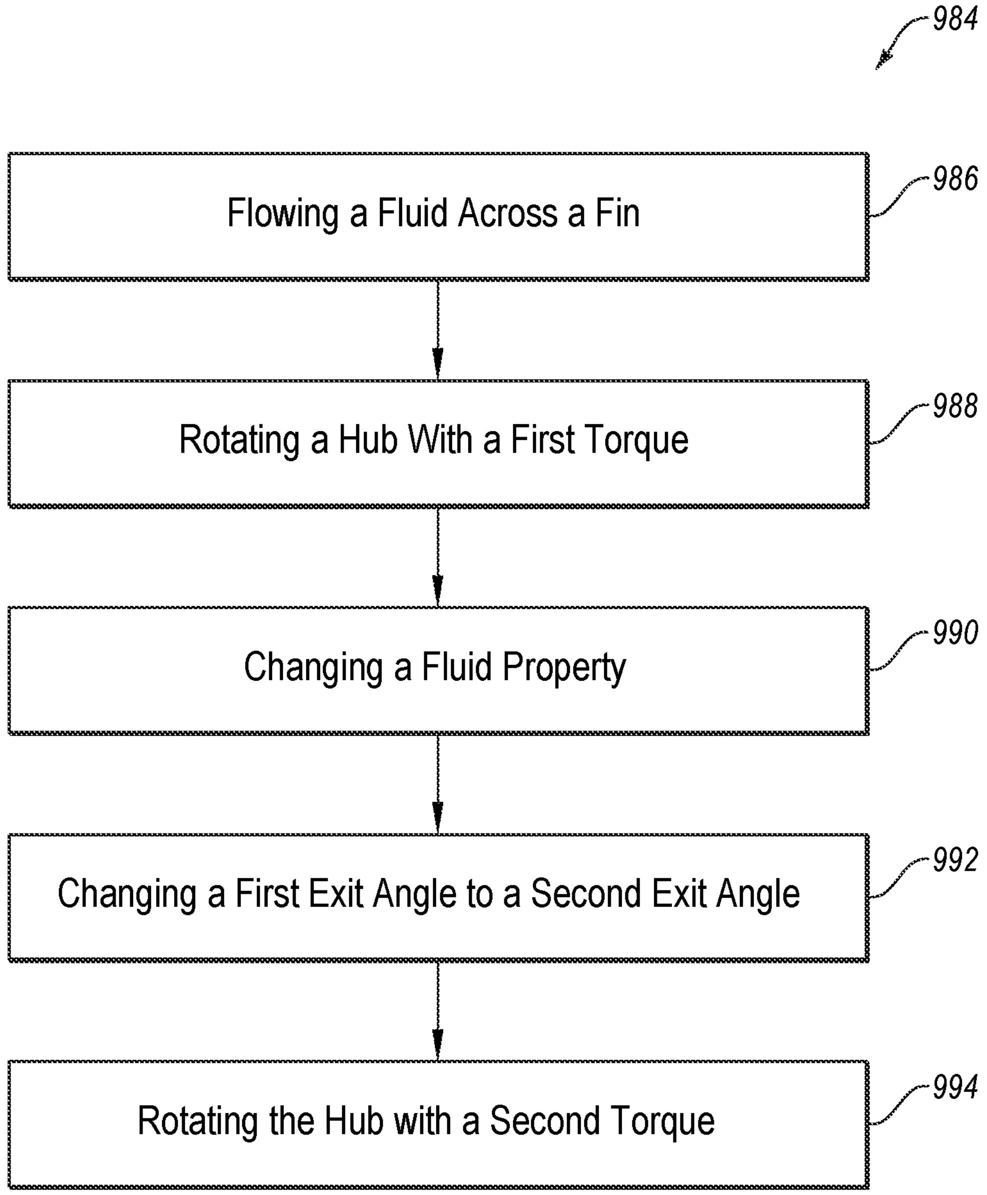

FIG. 10 is a method chart of a method for regulating torque, according to at least one embodiment of the present disclosure.

DETAILED DESCRIPTION

This disclosure generally relates to devices, systems, and methods for downhole turbines with fins having a variable pitch or exit angle. Downhole turbines rotatable by a drilling fluid may apply a torque to a downhole tool. The torque applied to the downhole tool may vary according to changes in one or more drilling fluid parameters. Fins according to the present disclosure may be deformable or rotatable in response to the changes in the one or more drilling fluid parameters. Deformation or rotation of the fin will cause a tip of the fin to deflect, which changes the exit angle of the fin. This will reduce the variation in the torque applied to the downhole tool by the downhole turbine due to changing drilling fluid parameters. In this manner, the variation of torque applied to the downhole tool by the downhole turbine may be reduced. Reducing the variation of torque applied to the downhole tool may increase the effectiveness of the downhole tool.

For example, a rotary steerable system (RSS) may include at least one downhole turbine that applies a torque to an independently rotating member. The torque applied by the downhole turbine to the independently rotating member may cause the independently rotating member to rotate with a different rotational rate than a surrounding drill pipe. The torque applied by the downhole turbine may cause the independently rotating member of the RSS to remain geo-stationary, or stationary relative to an exterior reference frame, such as true north, magnetic north, the force of gravity, or other reference frame. Fins on a downhole turbine that deform or rotate in response to changing drilling fluid parameters may reduce the variation in torque applied to the rotating member. This may improve the stability of the RSS, which may improve wellbore trajectory and provide other improvements.

In other examples, a downhole power generation system may include a downhole turbine connected to a rotor that rotates relative to a stator. The torque applied to the down-hole turbine may correspond with a rotational rate of the rotor. Fins on a downhole turbine that deform or rotate in response to changing drilling fluid parameters may reduce the variation in torque applied to the rotor. This may help to produce a more constant power output. Furthermore, this may help to prevent overheating of the generator, which may be caused by the rotor spinning too fast.

Figure 1:
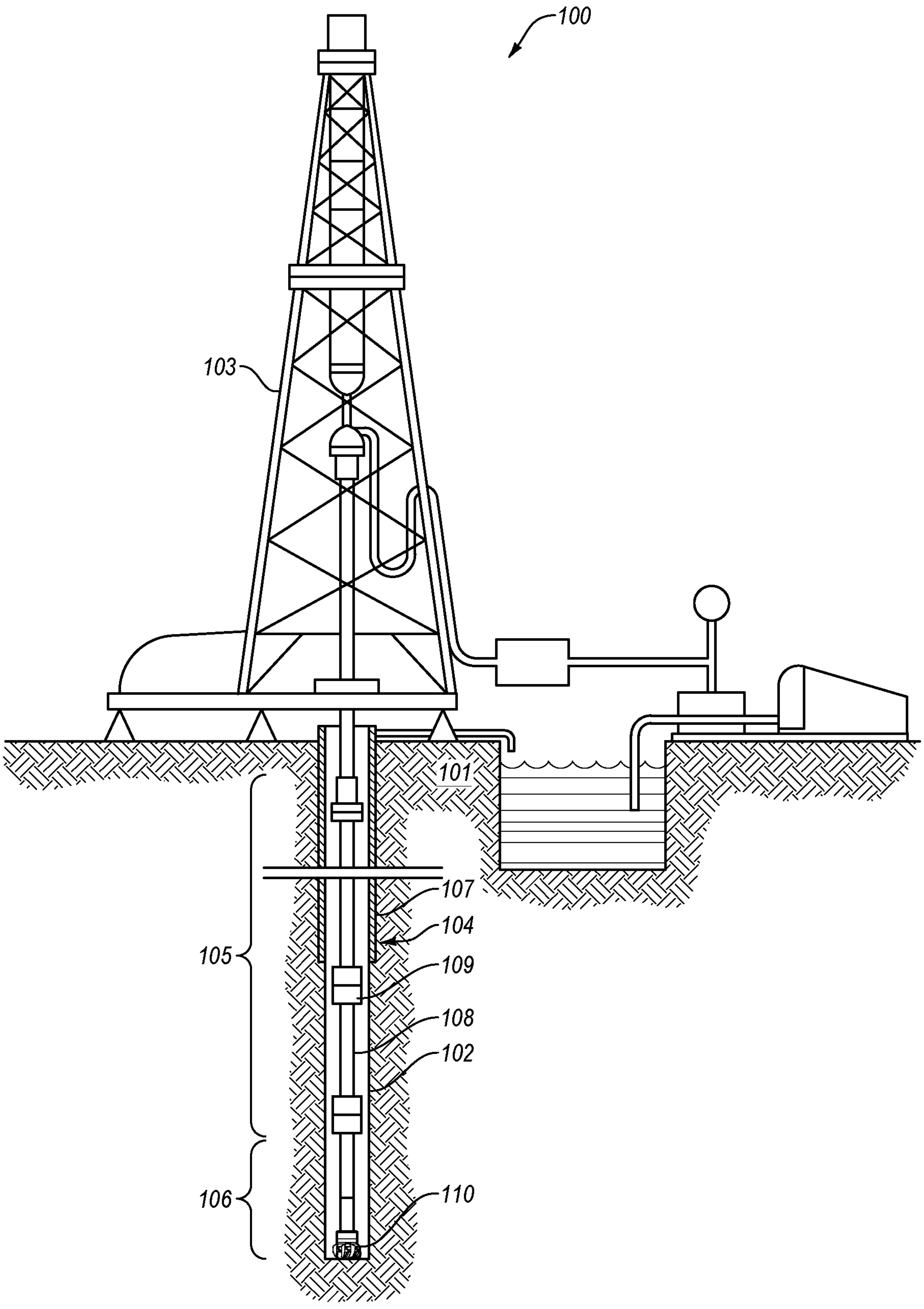
FIG. 1 is a system view of a downhole drilling system, according to at least one embodiment of the present disclosure.

FIG. 1 shows one example of a drilling system 100 for drilling an earth formation 101 to form a wellbore 102. The drilling system 100 includes a drill rig 103 used to turn a drilling tool assembly 104 which extends downward into the wellbore 102. The drilling tool assembly 104 may include a drill string 105, a bottomhole assembly (BHA) 106, and a bit 110, attached to the downhole end of drill string 105.

The drill string 105 may include several joints of drill pipe 108 connected end-to-end through tool joints 109. The drill string 105 transmits drilling fluid through a central bore and transmits rotational power from the drill rig 103 to the BHA 106. In some embodiments, the drill string 105 may further include additional components such as subs, pup joints, etc. The drill pipe 108 provides a hydraulic passage through which drilling fluid is pumped from the surface. The drilling fluid discharges through selected-size nozzles, jets, or other orifices in the bit 110 for the purposes of cooling the bit 110 and cutting structures thereon, and for lifting cuttings out of the wellbore 102 as it is being drilled.

The BHA 106 may include the bit 110 or other components. An example BHA 106 may include additional or other components (e.g., coupled between the drill string 105 and the bit 110). Examples of additional BHA components include drill collars, stabilizers, measurement-while-drilling (MWD) tools, logging-while-drilling (LWD) tools, down-hole motors, underreamers, section mills, hydraulic discon-nects, jars, vibration or dampening tools, other components, or combinations of the foregoing.

In general, the drilling system 100 may include other drilling components and accessories, such as special valves (e.g., kelly cocks, blowout preventers, and safety valves). Additional components included in the drilling system 100 may be considered a part of the drilling tool assembly 104, the drill string 105, or a part of the BHA 106 depending on their locations in the drilling system 100.

The bit 110 in the BHA 106 may be any type of bit suitable for degrading downhole materials. For instance, the bit 110 may be a drill bit suitable for drilling the earth formation 101. Example types of drill bits used for drilling earth formations are fixed-cutter or drag bits. In other embodiments, the bit 110 may be a mill used for removing metal, composite, elastomer, other materials downhole, or combinations thereof. For instance, the bit 110 may be used with a whipstock to mill into casing 107 lining the wellbore 102. The bit 110 may also be a junk mill used to mill away tools, plugs, cement, other materials within the wellbore 102, or combinations thereof. Swarf or other cuttings formed by use of a mill may be lifted to surface, or may be allowed to fall downhole.

One or more downhole tools on the BHA 106 may include a turbine rotatable by the drilling fluid that passes through the drill string 105. For example, the turbine may be located on a rotary steerable system or a downhole power generation system. The turbine exerts a torque on the downhole tool, the torque being related to a fluid property of the drilling fluid. The downhole tool has a target torque at which the downhole tool is most effective. For example, as discussed above, an RSS may have a target torque or a target torque range at which the independently rotating member may stably remain geostationary. Changing drilling fluid properties may change the torque applied to the RSS, which may decrease the stability of the RSS. Maintaining a stable geostationary position may improve accuracy of instruments on the RSS, which may improve RSS performance, which may improve wellbore trajectory accuracy, formation measurements, and other RSS performance properties. Maintaining the target torque may therefore help to improve these RSS perfor-mance properties. In other examples, a downhole power generator generates power in response to the fluid flow rotating a turbine. Changing fluid properties may change the rotational rate of the turbine, which may change the power output of the downhole power generator. Maintaining the target torque may maintain the rotational rate of the turbine, which may help the downhole power generator to maintain a steady power output. This may help to prevent damage to electronic components. Furthermore, maintaining the target torque for the downhole generator may help to reduce overheating of the generator, thereby improving the service life of the generator.

The turbines of the present disclosure include adjustable fins that automatically adjust the torque on the drilling tool based on the changed fluid property. In this manner, the downhole tool may operate at or near the target torque even with variable drilling fluid properties. As discussed above, this may help to improve the effectiveness of the downhole tool, prevent damage to the downhole tool, improve the efficiency of the downhole tool, increase the service life of the downhole tool, and combinations of the foregoing. This may, in turn, improve the rate of penetration and/or reduce the drilling cost per foot.

Figure 2:
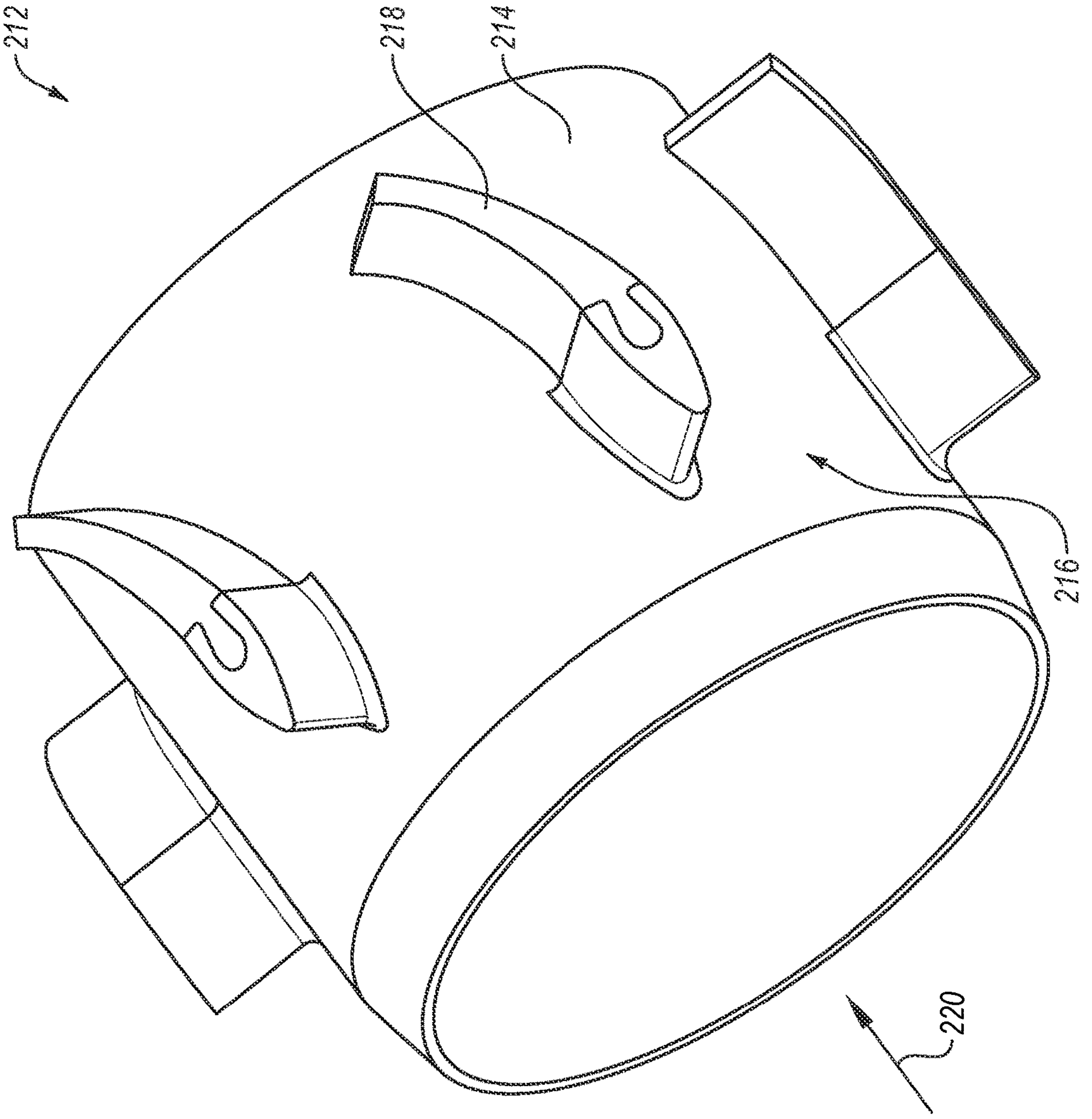
FIG. 2 is a perspective view of a downhole turbine, according to at least one embodiment of the present disclosure.

FIG. 2 is a representation of a downhole turbine 212 with adjustable fins 218, according to at least one embodiment of the present disclosure. The downhole turbine 212 may include a hub 214. The hub 214 may have an outer surface 216. One or more fins 218 may be spaced around and connected to or attached to the hub 214. In some embodi-ments, the fins 218 may be directly connected to the outer surface 216 of the hub 214. In other embodiments, the fins 218 may be offset from the outer surface 216. For example, the fins 218 may be spaced apart from the outer surface 216 while being connected to the downhole turbine 212. In the embodiment shown, the fins 218 are connected to the hub 214 with a hub locking feature, as described in further detail in reference to FIG. 8-1.

In some embodiments, the downhole turbine 212 may include 2, 3, 4, 5, 6, 7, 8, 9, 10, 11, 12, 13, 14, 15, or more fins 218. In at least one embodiment, the fins 218 may be spaced evenly, or equidistantly, around the outer surface 216 of the hub 214. Although unusual, in other embodiments, the fins 218 may be spaced at unequal distances.

A fluid flow 220, such as a drilling fluid, may flow across the outer surface 216 of the hub. The fluid flow 220 may flow across the fins 218. The fluid flow 220 flowing across the fins 218 may exert a plurality of forces on the fins 218, including a lift force (e.g., a tangential force). The tangential force on the fins 218 may be transferred to the hub 214. In other words, the tangential force on the fins 218 may be applied to the hub 214 through, for example, the connection between the fins 218 and the downhole turbine 212. This may result in a torque on the hub 214, which, when sufficiently high, causes the hub 214 to rotate. The magnitude of the tangential force may vary at least in part based on the shape and/or orientation of the fins 218. Therefore, by controlling the shape and/or the orientation of the fins 218, the tangential force may be controlled. The downhole turbine 212 transfers a torque to a downhole tool that operates at a target torque, as described herein. By controlling the tangential force on the fins 218, the torque on the hub 214 may be controlled. Controlling the torque on the hub 214 may keep the torque applied to the downhole tool at or near the target torque. This may improve the effectiveness of the downhole tool.

As will be discussed below in more detail herein, particularly in reference to FIG. 5-1 through FIG. 6, the fins 218 of the downhole turbine 212 have an exit angle for the drilling fluid. The exit angle, at least in part, determines the torque applied to the downhole turbine. The fins 218 shown in embodiments of the present disclosure are adjustable in response to variations in the fluid flow. In other words, the exit angle of the fins 218 may change in response to variations in the fluid flow, which means that the torque transferred to the downhole tool is responsive to variations in the fluid flow. By controlling the range of torques (e.g., by controlling the exit angle of the fins 218) for a given range of drilling fluid properties, a user may control the range of torque applied to the downhole tool by the downhole turbine 212. This may help to improve the efficacy of the downhole tool.

Figures 1, 3:
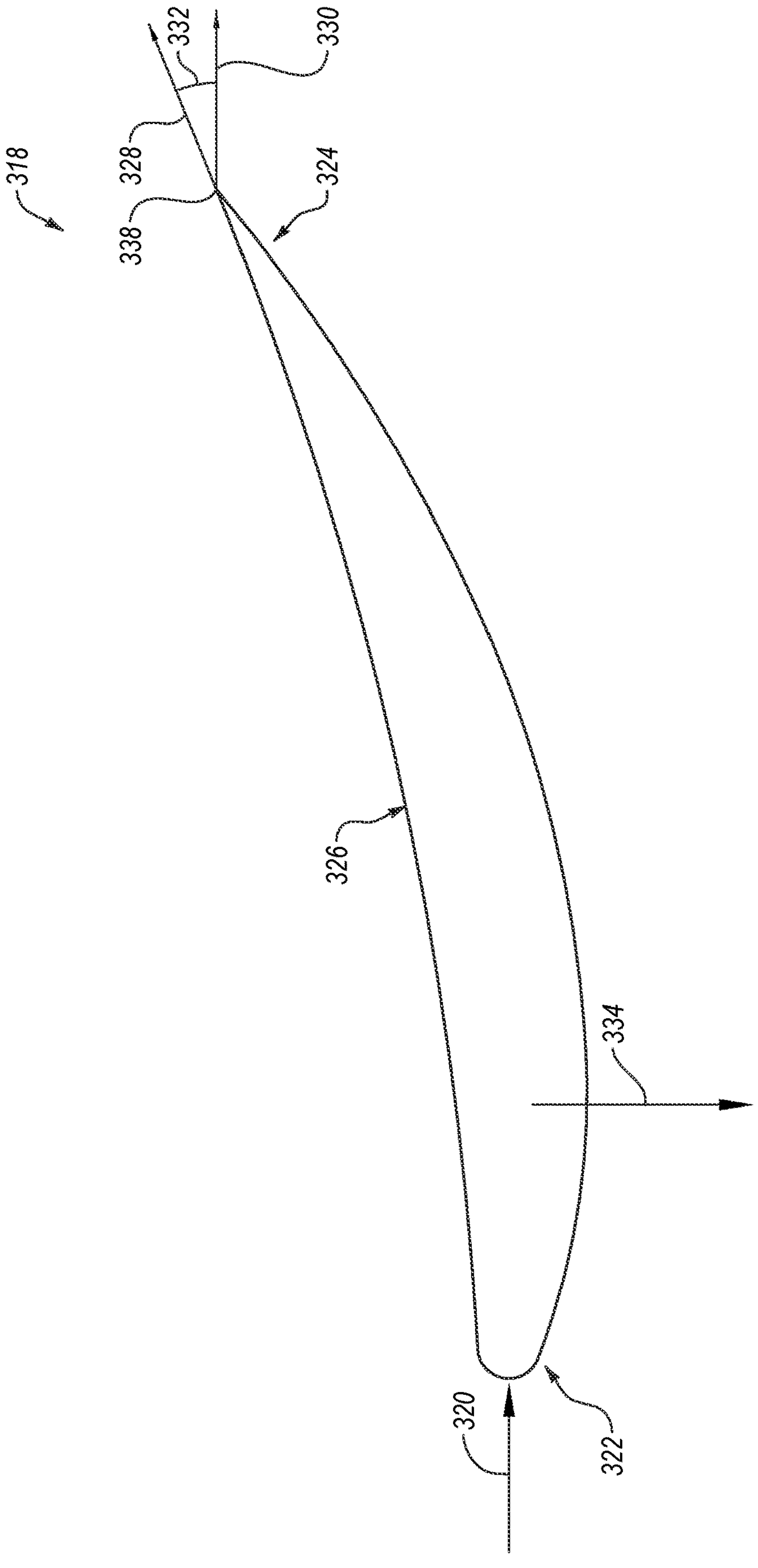
Figures 2, 3:
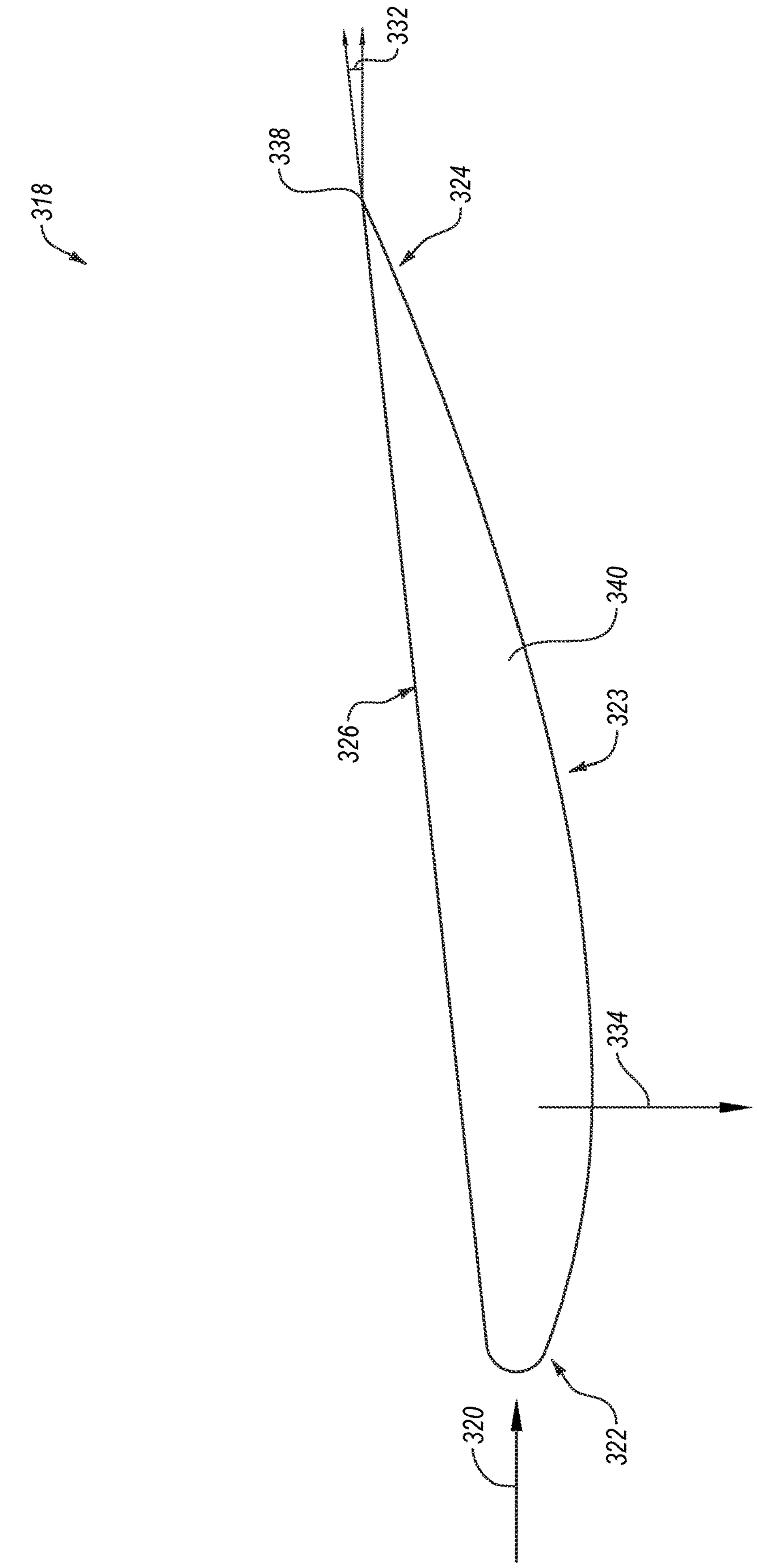

FIG. 3-1 is a schematic representation of a cross-section of a fin 318 in a first state, according to at least one embodiment of the present disclosure. The fin 318 may be used with any downhole turbine described herein (e.g., downhole turbines 212, 612, 712, 819) to provide adjustable torque to the downhole turbine and one or more associated downhole tools. The fins 318 may be connected (e.g., via a hub 214, 614, 714) to the downhole turbine. In the embodiment shown the fin 318 has an asymmetrical cross-sectional shape. However, the description related to FIG. 3-1 and similar figures should not be interpreted to be limited to asymmetrical cross-sectional shapes, but may include any shape of a fin 318, including symmetrical fins.

The fin 318 includes a leading edge 322 and a trailing edge 324. The leading edge 322 may be the side of the fin 318 that first comes into contact with a fluid flow 320. The trailing edge 324 may be the side of the fin 318 opposite the leading edge 322. In other words, fluid from the fluid flow 320 may travel along the fin 318 from the leading edge 322 to the trailing edge 324. Fluid from the fluid flow 320 may impact an impact surface 326 of the fin 318. The impact surface 326 may deflect the fluid from the fluid flow 320 so that it leaves the fin 318 at a tip 338 in an exit direction 328. The exit direction 328 may be different from a fluid flow direction 330. The angular difference in direction between the exit direction 328 and the fluid flow direction 330 is the exit angle 332.

In some embodiments, the exit direction 328 may be parallel to an exit orientation of the fin 318. In other words, the impact surface 326 may have an orientation near the trailing edge 324 or at the tip 338. The exit direction may be parallel to the orientation of the impact surface 326 near the trailing edge 324 or at the tip 338. In other embodiments, the exit direction 328 may be impacted by the fluid flow 320 such that the exit angle 332 is less than an angle between the orientation of the impact surface 326 near the trailing edge 324 and the fluid flow direction 330.

The exit angle 332 may help determine a tangential force 334 on the fin 318. In other words, the exit angle 332 may be related to the tangential force 334. For example, within a range of exit angles 332, a larger exit angle 332 may result in a larger tangential force 334. The tangential force 334 on the fin 318 may be transferred to a hub (e.g., the hub 214 of FIG. 2). Because the fin 318 is located on an outer surface of the hub, the tangential force 334 transferred to the hub may result in a torque applied to the hub. Therefore, within the range of exit angles 332, a larger exit angle 332 may increase the torque on the hub.

In some embodiments, the exit angle 332 may be in a range having an upper value, a lower value, or upper and lower values including any of −10°, 0°, 0.25°, 0.5°, 0.75°, 1.0°, 1.25°, 1.5°, 1.75°, 2.0°, 2.25°, 2.5°, 2.75°, 3.0°, 3.25°, 3.5°, 3.75°, 4.0°, 5°, 10°, 15°, 20°, 30°, 40°, 45°, 50°, 60°, or any value therebetween. For example, the exit angle 332 may be less than 60°. In another example, the exit angle 332 may be less than 3°. In yet other examples, the exit angle 332 may be less than 2°. In at least one embodiment, it may be critical that the exit angle 332 is less than 3° to prevent applying too much torque to the hub.

The fluid flow 320 may have a one or more fluid properties that affect the tangential force 334. For example, an increased volumetric flow rate may increase tangential force 334. In other examples an increased fluid velocity may increase the tangential force 334. In still other examples, an increased fluid density (e.g., mud weight) may increase the tangential force 334. In yet other examples, an increased fluid viscosity may increase the tangential force 334. In further embodiments, an increased fluid pressure may increase the tangential force 334. In other words, volumetric flow rate, fluid velocity, fluid density, fluid viscosity, fluid pressure, other fluid properties, or combinations of the foregoing may affect the tangential force 334.

Increasing the tangential force 334, and therefore the torque applied to the hub, may increase the rotational rate of the hub. In some embodiments, increasing the rotational rate of the hub may be harmful to a downhole tool. For example, a turbine for power generation may have a maximum turbine rotational rate. A rotational rate higher than the maximum turbine rotational rate may cause the power generator, or electronic components connected to the power generator, to increase in temperature such that the power generator "burns out," or fails. By controlling the torque applied to the hub, the power generated by the generator may be controlled, for example, by controlling the rotational rate of the hub.

In other examples, a rotary steerable system (RSS) may utilize turbines to maintain a downhole sub in a geostationary orientation. The turbines may transfer a torque to the downhole sub based on the torque applied to the turbine by a plurality of fins 318. Significant torque variations, or torque variations that are large in magnitude, may result in imperfect stabilizing of the downhole sub. By controlling the torque of the turbine, the RSS may more easily maintain a constant geostationary orientation.

Varying fluid properties may vary the tangential force 334, and therefore the torque applied to the hub. In some embodiments, during downhole drilling operations, fluid properties may significantly change in magnitude. For example, mud pulse telemetry uses changes in the fluid pressure, or pressure pulses, to communicate information from downhole to the surface and vice versa. These pressure pulses may cause significant, periodic changes in the torque applied to the hub. In other examples, fluid density may be changed based on a density of the cuttings to be removed to the surface, or based on another formation characteristic.

The tangential force, and therefore the torque on the hub, may be changed by changing the exit angle 332. In other words, by controlling the exit angle 332, the tangential force, and therefore the torque on the hub, may similarly be controlled.

FIG. 3-2 is a representation of the fin 318 of FIG. 3-1 in a second state, according to at least one embodiment of the present disclosure. In the embodiment shown, the fin 318 is deformable from the first state having the shape shown in FIG. 3-1 to the second state having the shape shown in FIG. 3-2. In other words, the fin 318 may have a first state as shown by the first shape and the first exit angle 332 in FIG. 3-1, and the fin 318 may have a second state as shown by the second shape and the second angle 332 in FIG. 3-2, and the fin 318 may change in shape from a first shape to the second shape.

In some embodiments, at least a portion of the fin 318 may deform in response to a change in fluid properties, thereby changing the fin 318 from the first state to the second state. For example, as the fluid flow 320 flows across the fin 318, fluid from the fluid flow 320 may exit the tip 338 with an exit force. This may exert a reaction force on the fin 318 and the tip 338, which may place stresses on a body 340 of the fin 318. As the force of the fluid flow 320 exiting the tip 338 increases, the reaction force against the fin 318 and the tip 338, may be increased, thereby increasing the stresses on the body 340. This may cause at least a portion of the body 340 to deform in response to the fluid flow 320. In other words, the impact surface 326 of the fin 318 may flatten. Deformation of the body 340 may cause the tip 338 to deflect in response to the fluid flow 320, and the extent of the deflection of the tip 338 may change based on a change in a property of the fluid flow 320. This may change the exit angle 332, which may change the tangential force 334, thereby changing the torque applied to the hub. In other words, the exit angle 332 may be changeable based on a property of the fluid flow 320.

For example, when the volumetric fluid flow is increased, the fluid from the fluid flow 320 may exit the tip 338 with increased force. This may increase the reaction force against the tip 338, causing the fin 318 to deform, or causing the tip 338 to deflect. This may in turn reduce the exit angle 332, thereby reducing the torque applied to the hub. In other examples, when the density of the fluid flow 320 is increased, the reaction force against the tip 338 may be increased. This may cause the fin 318 to deform, or cause the tip 338 to deflect. In this manner, the fin 318 may change from the first state with the first shape and the first exit angle 332 shown in FIG. 3-1 to the second state with the second shape the second exit angle 332 shown in FIG. 3-2.

At least a portion of the fin 318 may be made from an elastically deformable material. In other words, after the fin 318 has deformed, when the deforming force (e.g., the force applied from the fluid flow 320) is decreased, the fin 318 may elastically return to the first state, or to a relaxed, neutral, or unstressed shape. In other words, the fin 318 may be elastically deformable by the fluid flow 320. For example, when a fluid pressure is decreased, the reaction force against the tip 338 may be decreased, thereby reducing the deforming force, and allowing the body 340 to return from the second state, or a stressed or deformed shape, to the first state, or a relaxed, neutral, or unstressed shape. In some embodiments, the fin 318 may be viewed as a cantilevered spring, supported from a fin support.

In some embodiments, the elastically deformable material that at least a portion of the fin 318 is fabricated from may include rubber, an elastomer, hydrogenated nitrile butadiene rubber (HNBR), fluoroelastomer (FKM), spring steel, other spring materials, steel coated with an erosion resistant coating, cobalt-chromium alloys, other elastic material, or combinations thereof. In some embodiments, the fin 318 may be made from an inner core of spring steel that is coated with another elastic material, such as rubber.

In some embodiments, the material of the fin 318 may have a Young's modulus. In some embodiments, the Young's modulus may be in a range having an upper value, a lower value, or upper and lower values including any of 10 MPa, 25 MPa, 50 MPa, 75 MPa, 100 MPa, 125 MPa, 150 MPa, 175 MPa, 200 MPa, 250 MPa, 300 MPa, 500 MPa, 1.0 GPa, 10 GPa, 50 GPa, 100 GPA, 150 GPA, 200 GPA, 300 GPA, 400 GPA, 500 GPA, 600 GPA, or any value therebetween. For example, the Young's modulus may be greater than 1 MPa. In another example, the Young's modulus may be less than 600 GPa. In yet other examples, the Young's modulus may be any value in a range between 1 MPa and 600 GPa. A low Young's modulus may represent a highly deformable material, such as certain types of rubber. A high Young's modulus may represent a stiff material, such as steel or tungsten carbide. In some embodiments, it may be critical that the Young's modulus of the fin 318 is approximately 200 MPa to achieve a balance of elasticity and stiffness. In other embodiments, the Young's modulus is selected to produce the desired effect, or in other words, the Young's modulus is selected to produce a relatively constant torque based on changing properties of the fluid flow 320.

In some embodiments, an entirety of the fin 318 may deform in response to a change in fluid properties. For example, an entirety of the fin 318 may have a low Young's modulus. In other embodiments, only the trailing edge 324 may be elastically deformable, while the remaining portion of the fin 318 remains in its first state. For example, the trailing edge 324 may have a smaller, or a much smaller, Young's modulus than the leading edge 322, such as a leading edge 322 made from tungsten carbide and a trailing edge 324 made from rubber. In some embodiments, the fin 318 may include three or more different materials having different Young's moduli. For example, the leading edge 322 may be stiff, or have a high Young's modulus, the trailing edge 324 may have a low Young's modulus, and a middle section 323 may have a Young's modulus that is between the leading edge 322 and the trailing edge 324. In some embodiments, the leading edge 322 may have a higher Young's modulus than the trailing edge 324.

In some embodiments, the fluid property that was changed from a first value to a second value, thereby changing the fin 318 from a neutral shape to a stressed shape, may be changed back to the first value to return the fin 318 back to the neutral shape. In other embodiments, a second fluid property may be changed to return the fin 318 back to the neutral shape. For example, an increase in fluid pressure may change the fin 318 from the neutral shape to the second shape, and a decrease in fluid density may change the fin 318 back to the neutral shape. In other examples, any combination of changes in fluid properties may change the shape of the fin 318 away from and subsequently back to the neutral position.

When the properties of the fluid flow 320 are held constant, the fin 318 may reach an equilibrium shape, the equilibrium shape including an equilibrium tangential force 334, and therefore an equilibrium torque on the hub. In other words, the fin 318 may maintain a steady exit angle 332 based on a given set of fluid flow 320 properties. As the properties of the fluid flow 320 are changed, then the fin 318 may reach a new equilibrium shape, and therefore a new equilibrium torque on the hub. Thus, the fin 318 may automatically adjust its shape based on changing properties of the fluid flow 320.

Conventional turbines may experience significant changes in the tangential force 334 and therefore the torque on the hub in response to changing properties of the fluid flow 320. Because the fin 318 has an adjustable exit angle 332, the changes in properties of the fluid flow 320 may result in less drastic changes of the tangential force 334 and therefore the torque on the hub. Furthermore, because the exit angle 332 automatically changes in response to changes in properties of the fluid flow 320, the torque on the hub may automatically change in response to changes in properties of the fluid flow 320. Thus, the torque on the hub may experience less drastic changes in response to changing fluid flow 320 properties than conventional turbines.

In some embodiments, the change in exit angle 332 may be in a range having an upper value, a lower value, or upper and lower values including any of 0.05°, 0.1°, 0.15°, 0.2°, 0.25°, 0.3°, 0.4°, 0.5°, 0.6°, 0.7°, 0.8°, 0.9°, 1.0°, 2°, 3°, 4°, 5°, 10°, 15°, 20°, 25°, 30°, 40°, 45°, 50°, 60°, or any value therebetween. For example, the change in exit angle 332 may be greater than 0.05°. In another example, the change in exit angle 332 may be less than 60.0°. In yet other examples, the change in exit angle 332 may be any value in a range between 0.05° and 60.0°. In further examples, the change in exit angle may be positive or negative, depending on the change in the fluid property. In at least one embodiment, it may be critical that the change in exit angle is less than 1.0° so that the fin 318 still applies a torque to the hub at fluid flow 320 rates with different fluid properties.

Figure 4:
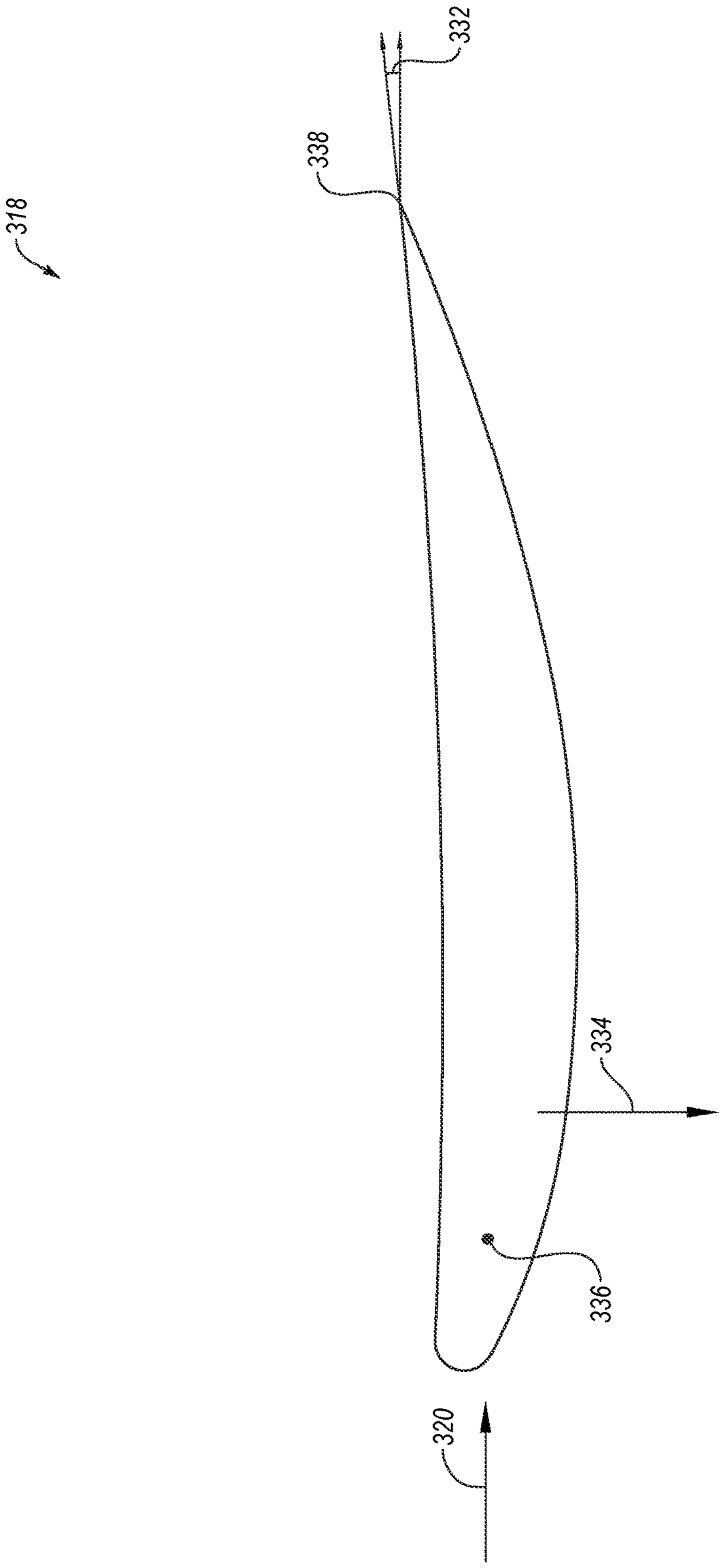
FIG. 4 is yet another schematic representation of a fin, according to at least one embodiment of the present disclosure.

FIG. 4 is another representation of the fin 318 of FIG. 3-1 in a second state, according to at least one embodiment of the present disclosure. In the view shown in FIG. 4, the fin 318 has been rotated clockwise from the first state having a first orientation as shown in FIG. 3-1. In the illustrated embodiment, this rotation is accomplished without elastically deforming any portion of the fin, as described in reference to FIG. 3-2. In some embodiments, the fin 318 both rotates and deforms. By rotating the fin 318 clockwise to the second state and the second orientation, the exit angle 332 has been decreased. Decreasing the exit angle 332 may decrease the tangential force 334, which may, in turn, decrease the torque applied to the hub.

In some embodiments, the fin 318 may be rotated from the first state having the first orientation shown in FIG. 3-1 to the second state having the second orientation shown in FIG. 4 while the fin 318 is still attached to the hub. In other words, the fin 318 may be rotated with respect to the outer surface of the hub. In some embodiments, the fin 318 may include a pivot point 336 having a pivot axis transverse to a longitudinal axis of the hub. The fin 318 may rotate relative to the pivot point 336 to change the exit angle 332. In other words, a tip 338 of the fin 318 may be deflected about the pivot point 336, which may change the exit angle 332.

In some embodiments, the fin 318 may rotate (e.g., relative to the pivot point) with respect to or in response to a change in fluid properties. For example, as the fluid flow 320 flows across the fin 318, fluid from the fluid flow 320 may exit the tip 338 with an exit force. This may exert a reaction force on the fin 318 and the tip 338, which may cause a moment about the pivot point 336. As the force of the fluid flow 320 exiting the tip 338 increases, the reaction force against the fin 318 and the tip 338, may be increased, thereby increasing the moment about the pivot point 336. This may cause the fin 318 to rotate about the pivot point 336 in response to the fluid flow 320. In other words, the tip 338 may deflect in response to the fluid flow 320, and the deflection of the tip 338 may change based on a change in the fluid flow 320. This may change the exit angle 332, which may change the tangential force 334, thereby changing the torque applied to the hub.

For example, when the volumetric fluid flow is increased, the fluid from the fluid flow 320 may exit the tip 338 with increased force. This may increase the reaction force against the tip 338, causing the fin 318 to rotate about the pivot point 336, or causing the tip 338 to deflect. This may in turn reduce the exit angle 332, thereby reducing the torque applied to the hub. In other examples, when the density of the fluid flow 320 is increased, the reaction force against the tip 338 may be increased. This may cause the fin 318 to rotate about the pivot point 336, or cause the tip 338 to deflect.

In some embodiments, a return force may cause the fin 318 to return to the first state, or a neutral, or an unstressed orientation. For example, the first state having the first orientation as shown in FIG. 3-1 may be a neutral orientation. A change in a fluid property may cause the fin 318 to change from the first state having the neutral orientation to the second state having the second orientation as shown in FIG. 4. When the fluid property reduces the reaction force, the fin 318 may return to the first state having the first orientation shown in FIG. 3-1. For example, when a fluid pressure is decreased, the reaction force against the tip 338 may be decreased, thereby reducing the moment about the pivot point 336 and removing the deflection of the tip 338. In some embodiments, the fin 318 may be viewed as a cantilevered spring, supported from a fin support, such as the pivot point 336.

When the properties of the fluid flow 320 are held constant, the fin 318 may reach an equilibrium position, the equilibrium position including an equilibrium tangential force 334, and therefore an equilibrium torque on the hub. In other words, the fin 318 may maintain a steady exit angle 332 based on a given set of fluid flow 320 properties. As the properties of the fluid flow 320 are changed, then the fin 318 may reach a new equilibrium position, and therefore a new equilibrium torque on the hub. Thus, the fin 318 may automatically adjust to changing properties of the fluid flow 320.

In some embodiments, the fin 318 may require a fin torque to rotate about the pivot point 336. In some embodiments, the fin torque may be in a range having an upper value, a lower value, or upper and lower values including any of 0.1 N·m, 0.5 N·m, 1 N·m, 5 N·m, 10 N·m, 15 N·m, 20 N·m, 25

N·m, 30 N·m, or any value therebetween. For example, the fin torque may be greater than 0.1 N·m. In another example, the fin torque may be less than 30 N·m. In yet other examples, the fin torque may be any value in a range between 0.1 N·m and 30 N·m. In at least one embodiment, it may be critical that the fin torque be between 0.1 N·m and 30 N·m to produce a constant range of torque for differing fluid properties.

In some embodiments, the fin 318 may experience a combination of deformation (as shown in FIG. 3-2) and rotation. For example, the fin 318 may at least partially deform and rotate in response to the fluid flow 320. In other examples, the fin 318 may rotate in response to low reaction forces by the fluid flow 320, and begin to deform at higher reaction forces by the fluid flow 320. In still other examples, the fin 318 may deform in response to low reaction forces by the fluid flow 320 and begin to rotate at higher reaction forces by the fluid flow 320. In this manner, the fin 318 may have a combined elasticity, or a combined resistance to deflection of the tip 338.

Figures 1, 5:
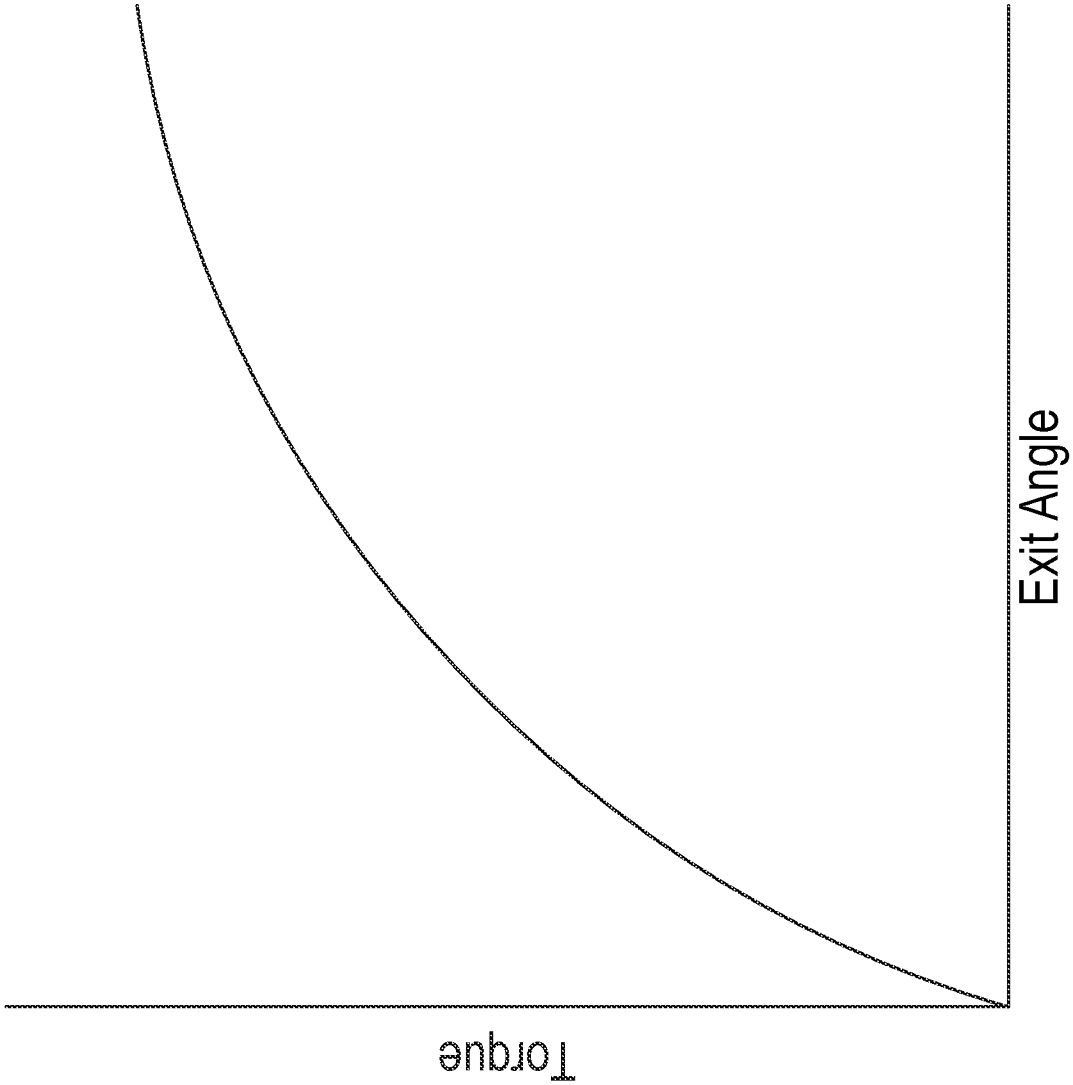
Figures 2, 5:
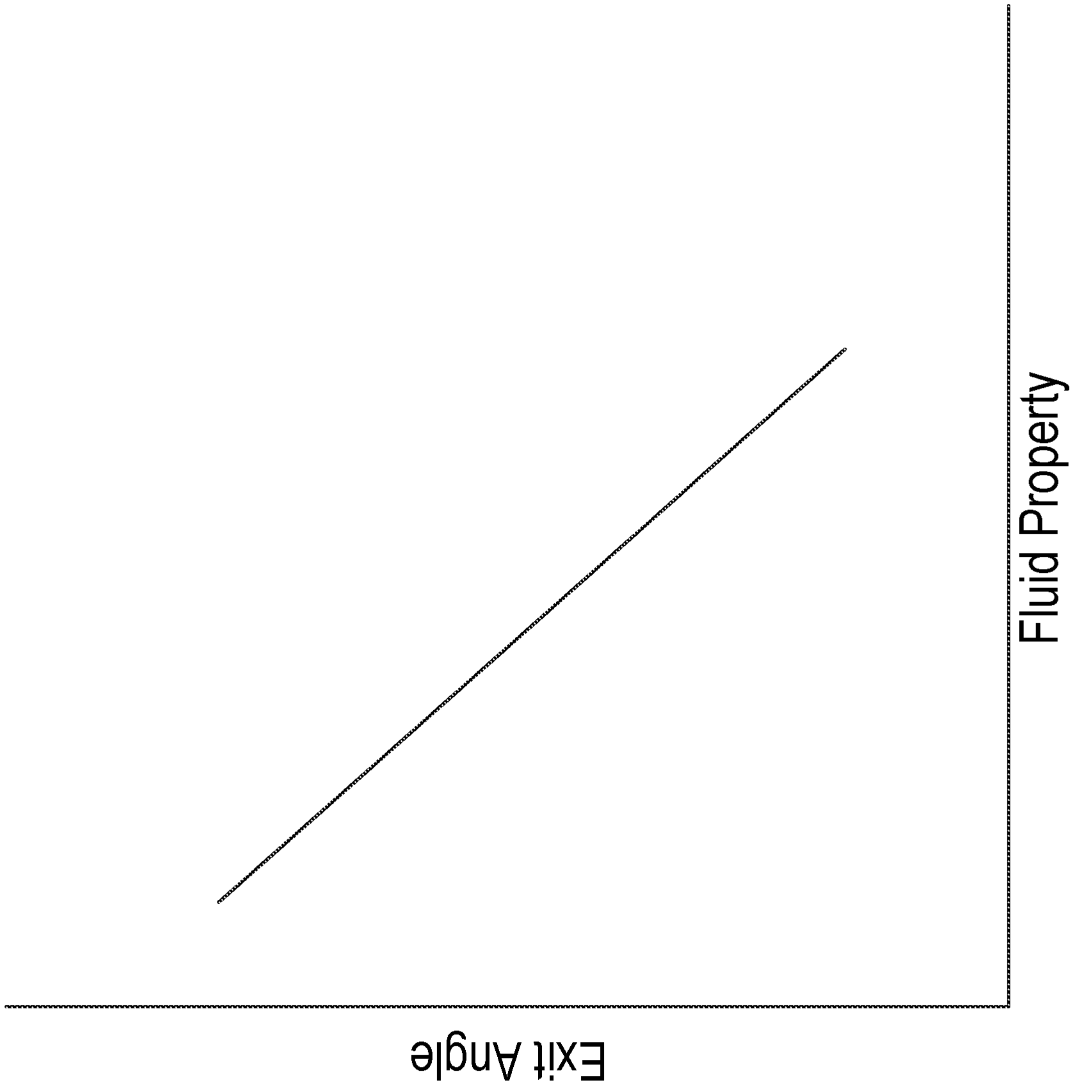
Figures 3, 5:
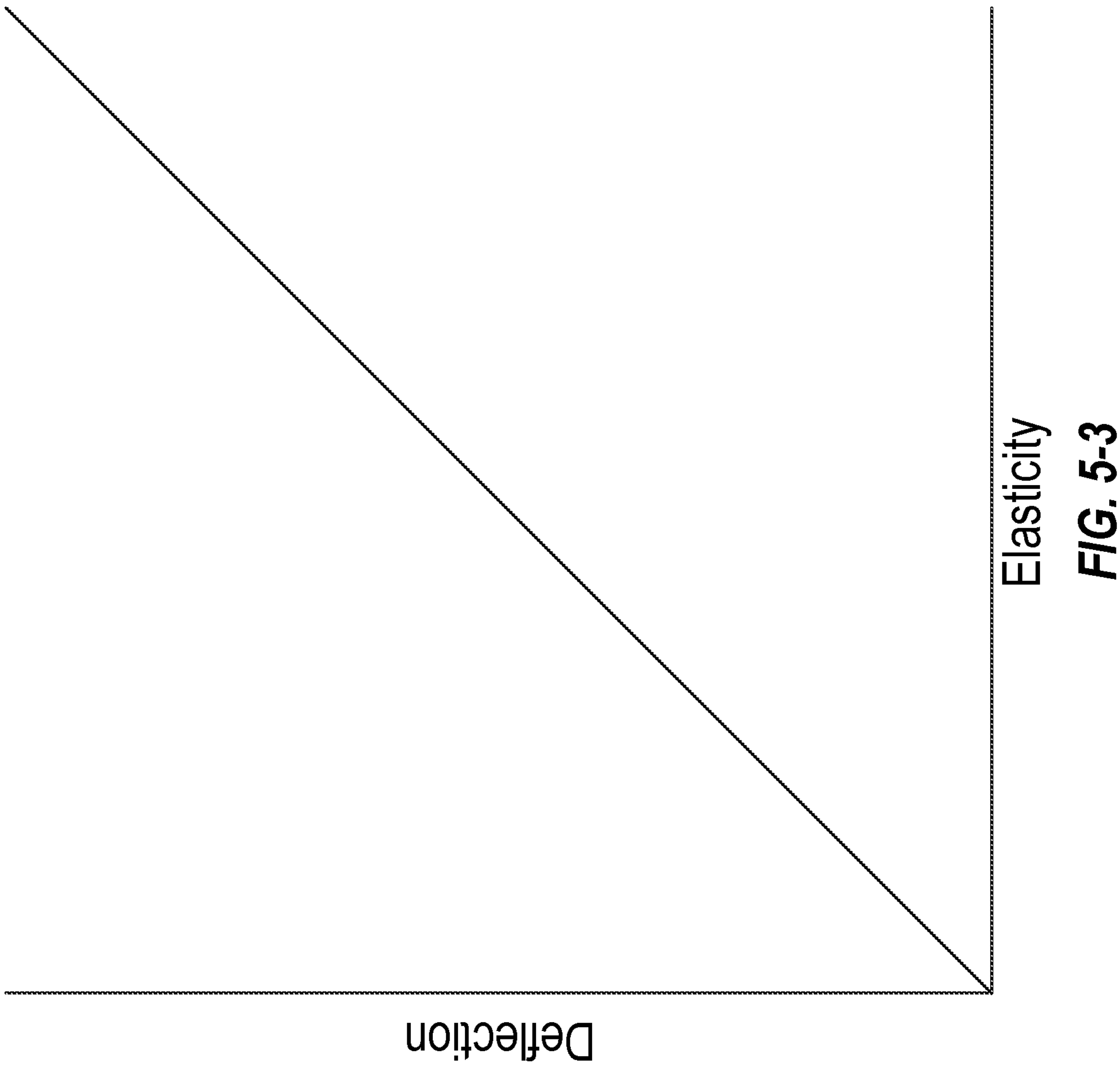

FIG. 5-1 is a graphical representation of the relationship between torque on the hub (e.g., the hub 214 of FIG. 2) and exit angle (e.g., exit angle 332 of FIG. 3-1), according to at least one embodiment of the present disclosure. As may be seen, over the range shown in FIG. 5-1, as the exit angle increases, the torque increases. Therefore, as discussed above, by changing the exit angle, the torque may be changed. As may be seen, as the exit angle is reduced close to zero, a small change in exit angle may result in a relatively large change in torque. Therefore, the elasticity of the fin (e.g., the fin 318 of FIG. 3-1), or the susceptibility of the fin to rotation and/or deformation, may be optimized based on the desired torque range and the anticipated variation in fluid properties. For example, the deflectability of the fins in response to the change of one or more fluid properties may be selected to minimize torque variability.

FIG. 5-2 is a graphical representation of the relationship between the exit angle and a drilling fluid property, according to at least one embodiment of the present disclosure. For example, the drilling fluid property may be the volumetric flow rate. As the volumetric flow rate increases, the exit angle may be decreased. Therefore, by knowing how much a fluid property may change, a user may then know how much the exit angle may change. When viewed in combination with FIG. 5-1, knowing how much the exit angle may change may allow the user to know the torque range for a given set of fluid properties.

FIG. 5-3 is a graphical representation of the relationship between elasticity of a fin, or the susceptibility of the fin to rotation and/or deformation, and deflection of the tip (e.g., the tip 338 of FIG. 3-2), according to at least one embodiment of the present disclosure. As may be seen, for a given fluid property, as the elasticity of the fin increases, the deflection of the tip increases. For example, a highly elastic fin may have a very large tip deflection in response to a fluid flow. As discussed above, the deflection of the tip is related to the exit angle. Thus, a more elastic material may result in a greater range of exit angle variation. When viewed in combination with FIG. 5-2 and FIG. 5-1, a user may select an elasticity of a fin that may result in an optimized torque range for a given set of fluid flow properties.

Figure 6:
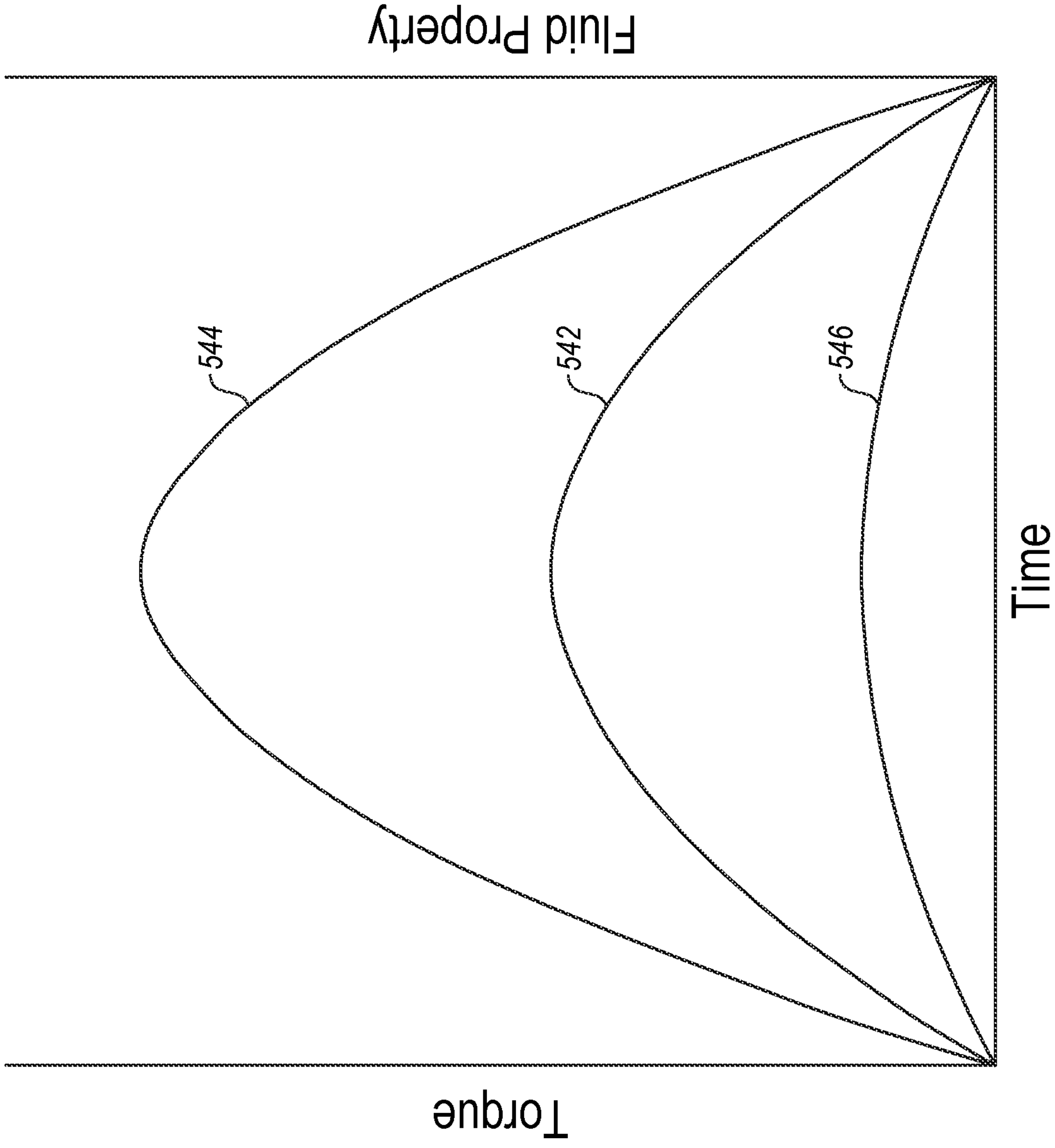
FIG. 6 is a graph representing the relationship between torque and a fluid property, according to at least one embodiment of the present disclosure.

FIG. 6 is a graphical representation of the torque applied to a hub (e.g., the hub 214 of FIG. 2) over time based on varied fluid property, according to at least one embodiment of the present disclosure. A fluid property (right y-axis) may be changed over time (x-axis), as represented by the curve 542. The curve 542 represents an increase followed by a decrease in the fluid property. Curve 544 represents the change in torque over time applied to a hub (e.g., hub 214 of FIG. 2) in response to the change in fluid properties, where the hub has conventional fins (e.g., fins that do not deflect in response to a change in fluid properties). Curve 546 represents the change in torque over time applied to a hub in response to the change in fluid properties, where the hub has fins with a variable exit angle (e.g., exit angle 332 of FIG. 3-1), as described in the present disclosure.

Comparison of curve 544 to curve 546 indicates that a fin with a variable exit angle may produce less variation in torque to the hub than conventional fins in response to changing fluid properties. In other words, a fin with a variable exit angle may produce a more constant torque as fluid properties are changed. For example, the changes in pressure caused by the mud pulse generator may result in variation in torque applied to the hub. A hub including fins with a variable exit angle may experience less variation in torque and/or rotational rate due to the changes in pressure. This may result in more constant power generation, improve the efficacy of an RSS, reduce damage to downhole rotating components, control the amount of thrust or drag on a blade of a downhole tool, and combinations of the foregoing.

Figures 1, 7:
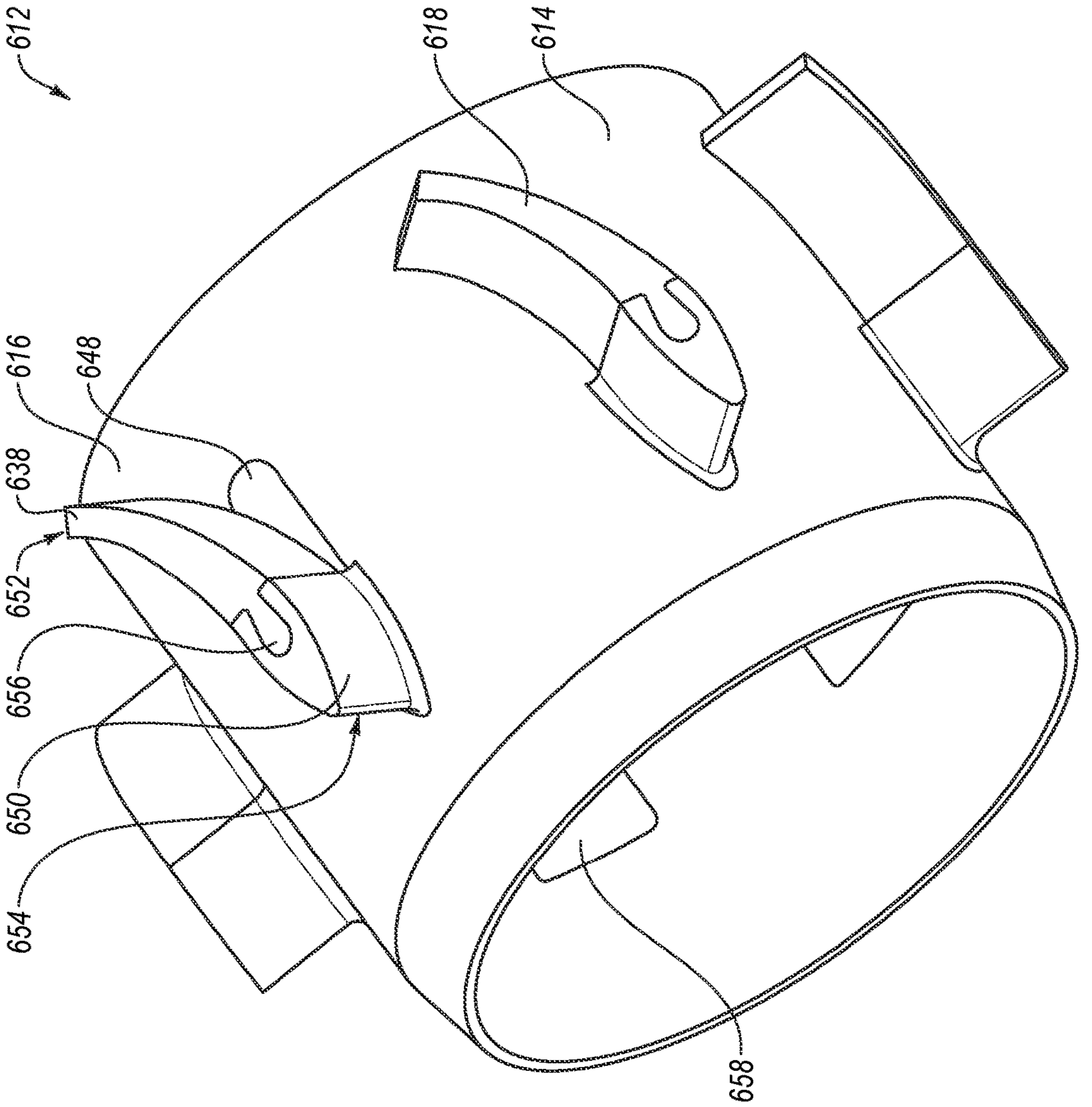
Figures 2, 7:
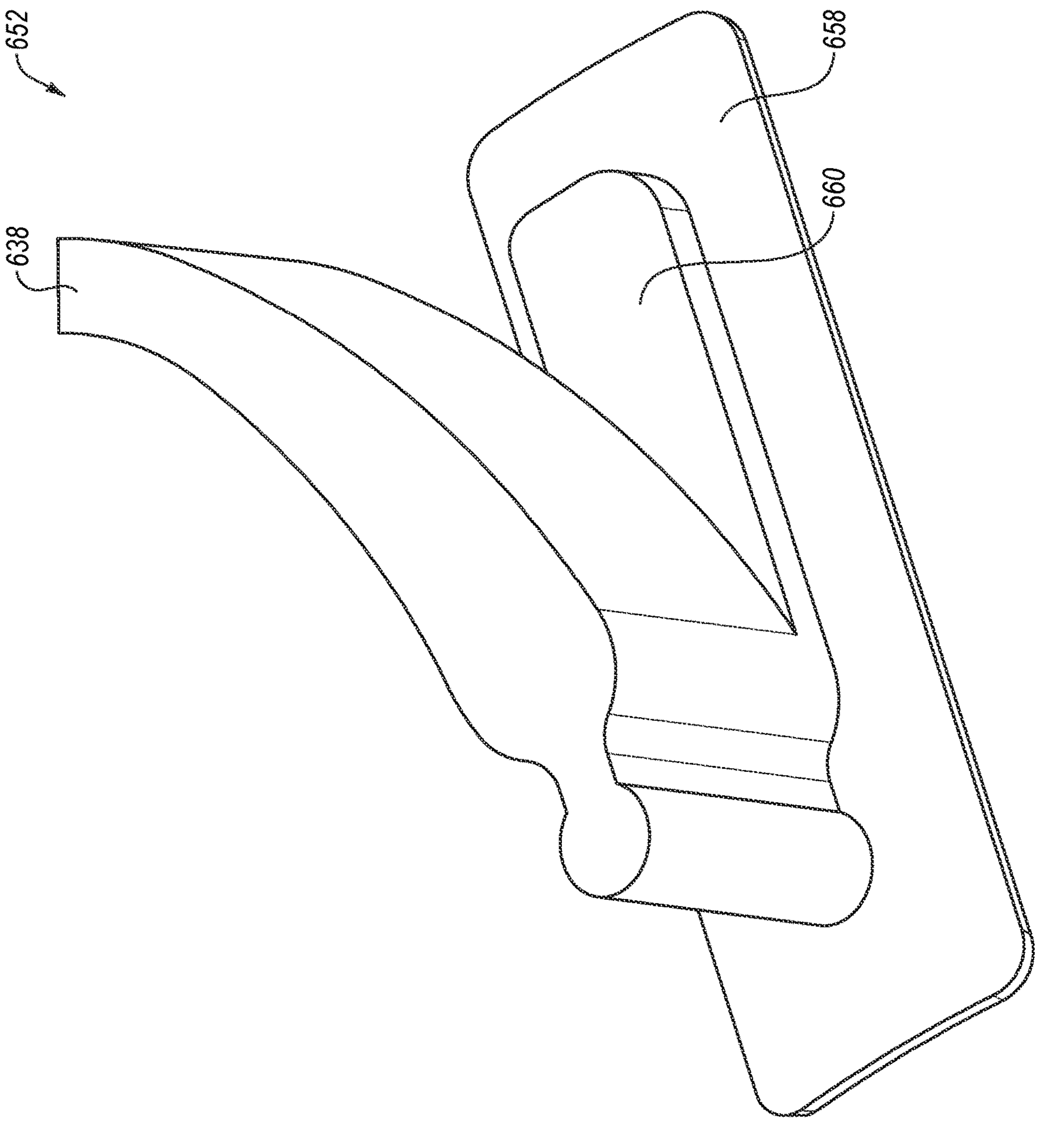

FIG. 7-1 is a perspective view of a representation of a downhole turbine 612, according to at least one embodiment of the present disclosure. The downhole turbine 612 may include a hub 614 and one or more fins 618. The fin 618 may include a leading edge 654 and a trailing edge 652. The fin 618 may include a movable portion at a trailing edge 652 of the fin 618. In at least one embodiment, the leading edge 654 of the fin 618 may be fixed to the hub 614.

The trailing edge 654 may include a tip 638. The tip 638 may be movable relative to the hub 614. In at least one embodiment, the tip 638 may be movable in response to a fluid flow across the fin 618. In other words, the tip 638 may deflect in response to the fluid flow across the fin. For example, at least a portion of the fin 618 may be elastically deformable. Thus, in response to the fluid flow, at least a portion of the fin 618 may deform, thereby causing the tip 638 to deflect. This may change the exit angle (e.g., exit angle 332 of FIG. 3-1) of the fin 618, thereby changing the torque applied to the hub 614. In at least one embodiment, the trailing edge 652 may be elastically deformable, and the leading edge 654 may be rigid. In other embodiments, the leading edge 654 and the trailing edge 652 may be elastically deformable.

In other embodiments, the fin 618 may be rotatable relative to the hub 614. Rotating the fin 618 relative to the hub 614 may deflect the tip 638, thereby changing the exit angle of the fin 618. In some embodiments, the fin 618 may be both elastically deformable and rotatable relative to the hub 614. In at least one embodiment, the trailing edge 652 may include a wear and/or erosion resistant material attached to the impact surface of an elastic material.

In some embodiments, the leading edge 654 may be fabricated from a wear and/or erosion resistant material. For example, the leading edge 654 may be fabricated from steel. In other examples, the leading edge 654 may be fabricated from an ultrahard material, such as tungsten carbide. In still other examples, the leading edge 654 may be fabricated from any other wear and/or erosion resistant material. In at least one embodiment, the leading edge 654 may be made from the same material as the hub 614. In other embodiments, the leading edge 654 may be attached to the outer surface 616 of the hub 614 with a mechanical fastener, by weld, by braze, by slip fit, by press fit, or by any other connection.

Because the leading edge 654 is located uphole of the fin 618, fluid flowing along the hub 614 may impact the leading edge 654 first, or before impacting the fin 618. Thus, the leading edge 654 may protect the fin 618 from erosion and/or wear caused by the impact from the fluid. This may help extend the life of the fin 618, which, as discussed above, may be fabricated from an elastic material, and may be less erosion and/or wear resistant than the leading edge 654. Thus, the leading edge 654 may be considered a fin support, or a fin protector.

The leading edge 654 may include a hub locking feature 650. In at least one embodiment, the hub locking feature 650 may be attached to the outer surface 616 of the hub 614. The trailing edge 652 may be connected to the hub locking feature 650. The hub locking feature 650 may be complementary to a fin locking feature 656. The fin locking feature 656 may be inserted into the hub locking feature 650, which may interlock the fin 618 with the hub 614. Thus, the hub locking feature 650 and the fin locking feature 656 may form an interlocking connection that prevents longitudinal movement of the trailing edge 652. For example, the hub locking feature 650 and the fin locking feature 656 may cooperate to form a dovetail connection. In other embodiments, the hub locking feature 650 and/or fin locking feature 656 may include a fastener, such as a screw or a bolt, that fastens the leading edge 654 to the trailing edge 652. In still other embodiments, the trailing edge 652 may be connected to the leading edge 654 using any other connection, including a threaded connection, a press-fit connection, an interference fit, a weld, a braze, combinations thereof, or any other connection.

In at least one embodiment, the trailing edge 652 of the fin 618 may be inserted through a hole 648 in a wall of the hub 614 and connected to the leading edge 654. The fin locking feature 656 may be inserted into the hub locking feature 650 from inside the hub 614. The trailing edge 652 may include a backing 658 that is larger than the hole 648. Thus, the trailing edge 652 may be secured longitudinally to the hub 614 by the connection of the fin locking feature 656 with the hub locking feature, and secured axially (e.g., radially) to the hub 614 by the backing 658.

FIG. 7-2 is a perspective view of a trailing edge 652 of the fin 618 of FIG. 7-1. The tip 638 of the trailing edge 652 may be movable relative to the backing 658. Thus, when the trailing edge 652 is inserted through the hole of the hub, the tip 638 may deflect with respect to the hub. The backing 658 may include a locating feature 660. The locating feature 660 may be sized to fit snugly within the hole (e.g., the hole 648 of FIG. 7-1). This may orient or locate the trailing edge 652 with respect to the hub. In this manner, the trailing edge 652 may be oriented to have a desired neutral exit angle. As fluid flows across the trailing edge 652, the locating feature 660 may keep the trailing edge 652 stable relative to the hub such that the trailing edge 652 may deform and/or rotate in response to the fluid flow.

Figures 1, 8:
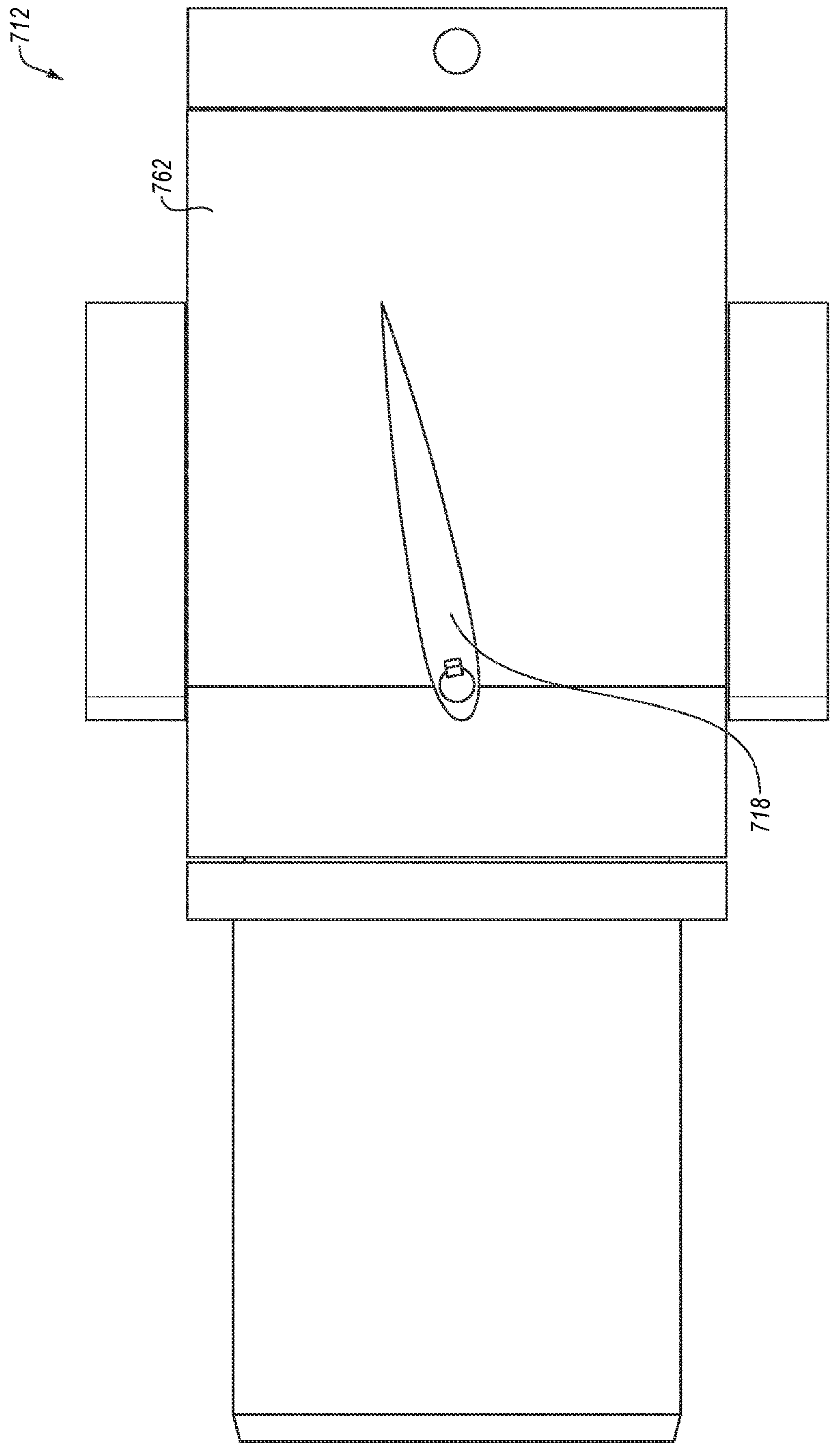
Figures 2, 8:
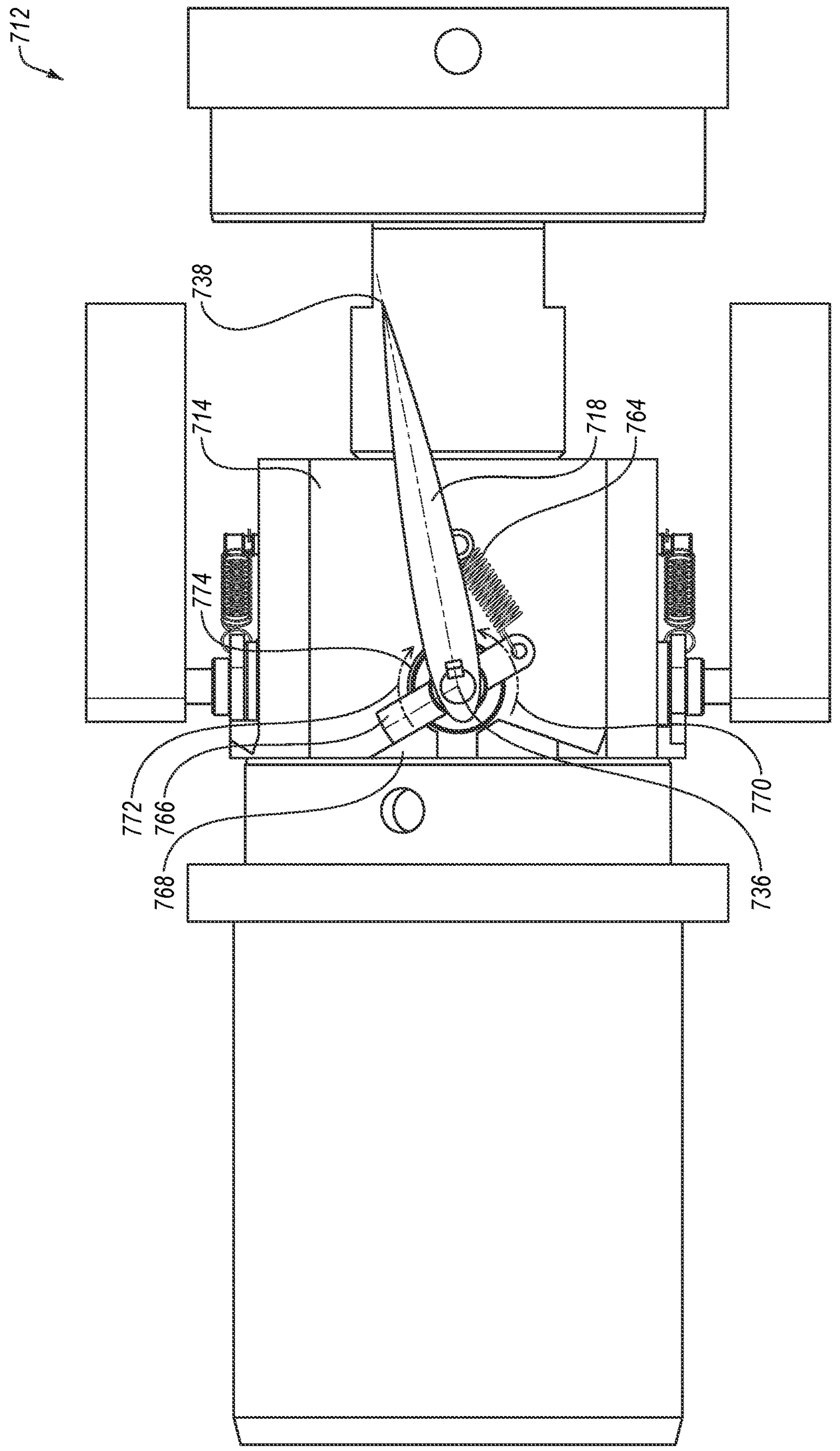

FIG. 8-1 is a side view of a turbine 712 with rotatable fins 718, according to at least one embodiment of the present disclosure. The turbine 712 may include a plurality of fins 718. A hub casing 762 may extend around a hub (e.g., hub 714 in FIG. 8-2). The fins 718 may be rotatable relative to the hub casing 762 in response to a fluid flow across the turbine 712. Rotating the fins 718 relative to the hub casing 762 may allow the turbine 712 to apply a torque to a downhole tool that varies in response to changes in the fluid flow. In this manner, the torque applied to the downhole tool may be maintained at or near a target torque for the downhole tool. This may improve the operation of the downhole tool.

FIG. 8-2 is a side view of the turbine 712 of FIG. 8-1, according to at least one embodiment of the present disclosure. In FIG. 8-2, the hub casing 762 of FIG. 8-1 has been removed, revealing the hub 714. The fins 718 may be rotatable relative to the hub 714 about a pivot point 736 in response to a fluid flow across the fins 718. A resilient member 764 may be connected to a rotator 766. The rotator 766 may be rotationally fixed relative to the fin 718. In other words, as the fin 718 rotates, the rotator 766 may rotate by the same amount.

The resilient member 764 may urge the rotator 766 to rotate until it contacts a rotator stop 768. When the rotator 766 contacts the rotator stop 768, the fin 718 may be in a neutral position or a neutral orientation. The resilient member 764 may urge the rotator 766 with a rotator torque 770 about the pivot point 736 to the neutral position or the neutral orientation. As fluid flow flows across the fin 718, the fluid exiting the tip 738 may exert a reaction force on the fin 718. The reaction force may apply a fluid torque 772 to the fin 718, which may be opposite the rotator torque 770. As the fluid torque 772 exceeds the rotator torque 770, the fin 718 may rotate. For example, in the embodiment shown, the fluid torque 772 may rotate the fin 718 clockwise. However, it should be understood that the orientation of the fin 718 may be changed such that the fluid torque 772 may rotate the fin 718 counterclockwise.

As properties in the fluid flow change, the fin 718 may automatically adjust to an equilibrium position or orientation based on the fluid flow. For example, in the embodiment shown, as the volumetric fluid flow increases, the fluid torque 772 may be greater than the rotator torque 770, thereby causing the fin 718 to rotate clockwise. As the volumetric fluid flow decreases, the resilient member 764 may pull on the rotator 766 and apply the rotator torque 770 to the fin 718, thereby causing the fin 718 to rotate counterclockwise.

In some embodiments, the resilient member 764 may be a spring, such as a coil spring, a leaf spring, a wave spring, or any other spring. In other embodiments, the resilient member 764 may be an elastically deformable material, such as rubber or other elastomer. In still other embodiments, the resilient member 764 may be any other resilient member.

The rotator angle 774, or the relative rotational position of the rotator 766 with the fin 718 may affect the torque applied by the resilient member 764. In some embodiments, the rotator angle 774 may be in a range having an upper value, a lower value, or upper and lower values including any of −10°, 0°, 0.25°, 0.5°, 0.75°, 1.0°, 1.25°, 1.5°, 1.75°, 2.0°, 2.25°, 2.5°, 2.75°, 3.0°, 3.25°, 3.5°, 3.75°, 4.0°, 5°, 10°, 15°, 20°, 30°, 40°, 45°, 50°, 60°, or any value therebetween. For example, the rotator angle 774 may be less than 60°. In another example, the rotator angle 774 may be less than 3°. In yet other examples, the rotator angle 774 may be less than 2°. In some embodiments, with small or large rotator angles 774 (i.e., close to 0° or 180°), an increase in fluid torque 772 may result in relatively small changes in the rotational orientation of the fin 718. In other examples, with rotator angles near 90°, an increase in fluid torque 772 may result in relatively large changes in the rotational orientation of the fin 718. In this manner, the turbine 712 may be optimized for anticipated conditions.

Figure 9:
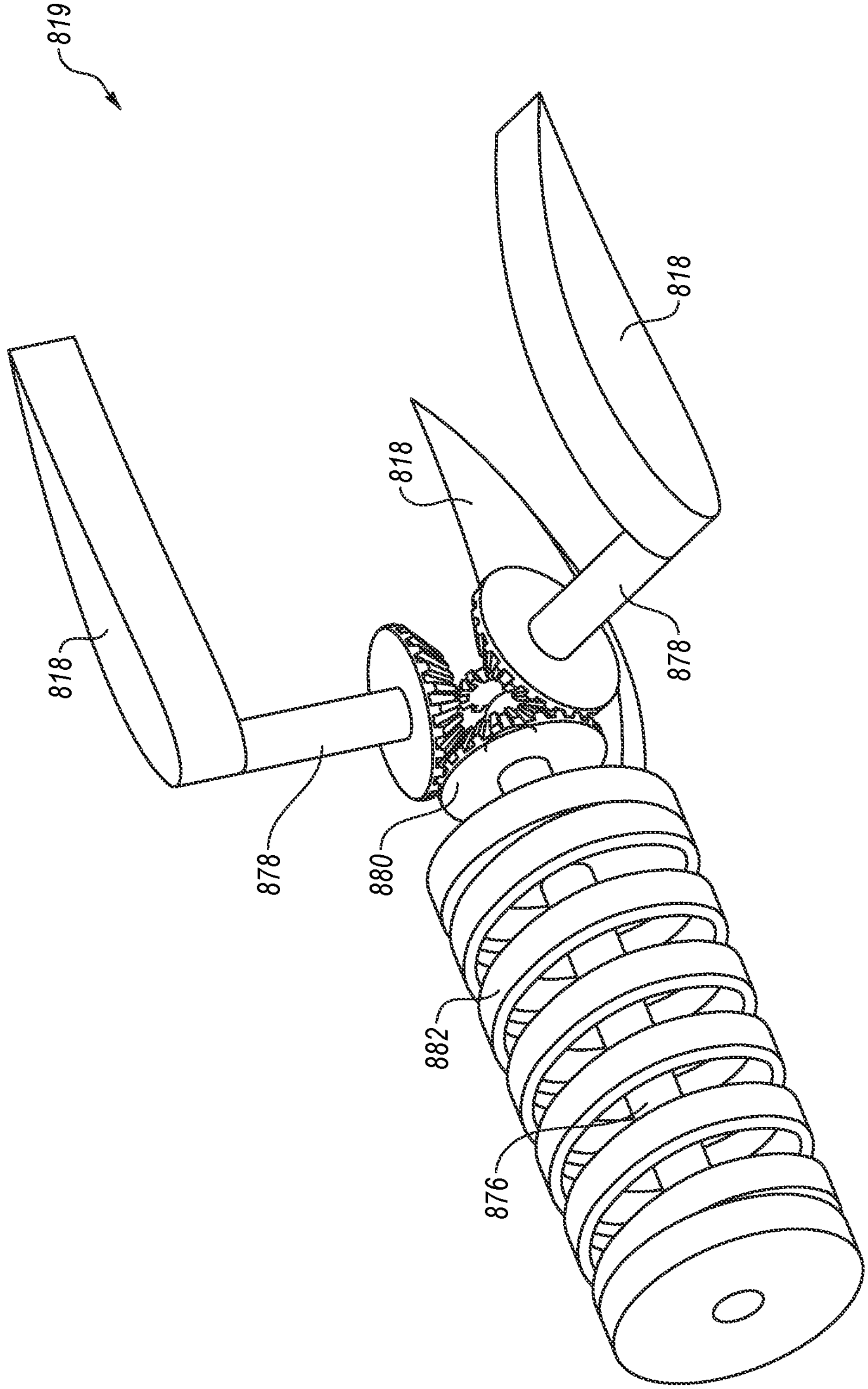
FIG. 9 is a perspective view of a variable pitch fin, according to at least one embodiment of the present disclosure.

FIG. 9 is a representation of a variable pitch fin 819, according to at least one embodiment of the present disclosure. The variable pitch fin 819 may include a plurality of fins 818 may be attached to a central control rod 876. Displacement rods 878 may connect each fin 818 to a bevel gear 880. The bevel gear 880 may be connected to the central control rod 876, which may include a torsion resistant member 882. Drilling fluid flowing across the fins 818 may cause the fins 818 to pivot. This may cause the displacement rod 878 to rotate, thereby rotating the bevel gear 880 and the central control rod 876. The torsion resistant member 882 may resist the rotation of the bevel gear 880, thereby limiting the pivot of the fin 818. Thus, the variable pitch fin 819 may be responsive to changes in drilling fluid properties and maintain operational rotational velocities. A variable pitch fin 819 relative to the hub casing 762 may allow a turbine to apply a torque to a downhole tool that varies in response to changes in the fluid flow. In this manner, the torque applied to the downhole tool may be maintained at or near a target torque for the downhole tool. This may improve the operation of the downhole tool.

In some embodiments, the displacement rods 878 may be torsion rods, or rods that elastically twist in response to a torque, and then return to their original shape when the torque is removed. In at least one embodiment, displacement rods 878 as torsion rods may eliminate the need for the torsion resistant member 882. In other embodiments, displacement rods 878 as torsion rods may be combined with the torsion resistant member 882.

FIG. 10 is a representation of a method 984 for regulating torque on a turbine. The method 984 may include flowing a fluid across a fin at 986. The fluid may include a fluid property, such as volumetric fluid flow, fluid velocity, fluid pressure, fluid density, and combinations of the foregoing. The fin may be connected to a hub and include a first exit angle. The method 984 may include rotating a hub with a first torque at 988. The first torque may be based at least in part on the first exit angle. In other words, flowing the fluid across the fin may rotate the hub with a first torque based at least in part on the first exit angle.

Rotating the hub may include rotating the hub with a rotational rate. In some embodiments, the rotational rate may be in a range having an upper value, a lower value, or upper and lower values including any of 0 rotations per minute (RPM), 50 RPM, 100 RPM, 150 RPM, 200 RPM, 250 RPM, 300 RPM, 350 RPM, 400 RPM, 450 RPM, 500 RPM 550 RPM, 600 RPM, 700 RPM, 800 RPM, 900 RPM, 1,000 RPM, 1,250 RPM, 1,500 RPM, 1,750 RPM, 2,000 RPM, 2,500 RPM, 3,00 RPM, 3,500 RPM, or any value therebetween. For example, the rotational rate may be less than 3,500 RPM. In other examples, the rotational rate may be less than 1,000 RPM. In yet other examples, the rotational rate may be less than 350 RPM. In some examples, the rotational rate may be the same rotational rate as the downhole tool. In at least one embodiment, it may be critical that the rotational rate is between 300 and 600 RPM. This may apply the maximum torque from the hub to a downhole tool without stalling the hub.

The method 984 may include changing the fluid property at 990. For example, the volumetric fluid flow rate of the fluid may be changed. In other examples, the fluid density may be changed. In still other examples, a combination of fluid properties may be changed. The method 984 may further include changing the first exit angle to a second exit angle in response to changing the fluid property at 992. For example, increasing the volumetric fluid flow may decrease the exit angle, or change the first exit angle to a second exit angle that is less than the first exit angle. In other examples, decreasing the fluid density may increase the exit angle, or change the first exit angle to a second exit angle that is greater than the first exit angle.

In at least one embodiment, changing the first exit angle to the second exit angle may include changing a shape of the fin in response to changing the fluid property. For example, the fin may have a first shape having a first exit angle. In response to changing the fluid property, the fin may change in shape from the first shape to a second shape, the second shape having a second exit angle.

The method 984 may include rotating the hub with a second torque based at least in part on the second exit angle at 994. For example, a decreased exit angle, or a second exit angle that is less than the first exit angle, may result in a decreased torque, or a second torque that is less than the first torque. Similarly, an increased exit angle, or a second exit angle that is greater than the first exit angle, may result in an increased torque, or a second torque that is greater than the first exit angle.

In some embodiments, a downhole tool may have a target torque. For example, the target torque may be a maximum torque, above which components of the downhole tool may not function properly, or above which one or more components of the downhole tool may be damaged. For example, a power generator may have a maximum torque, above which the power generator or electrical components connected to the power generator may overheat and be damaged. In the same or other embodiments, the target torque may be an optimum torque, or a torque at which the downhole tool operates most effectively. For example, a torquer on an RSS may have an optimum torque at which the torquer may stabilize the RSS. In some embodiments, the rotating the hub with the first torque and/or the second torque may rotate the hub with a torque that is less than the target torque.

The embodiments of the turbines have been primarily described with reference to wellbore drilling operations; the turbines described herein may be used in applications other than the drilling of a wellbore. In other embodiments, turbines according to the present disclosure may be used outside a wellbore or other downhole environment used for the exploration or production of natural resources. For instance, turbines of the present disclosure may be used in a borehole used for placement of utility lines. Accordingly, the terms "wellbore," "borehole" and the like should not be interpreted to limit tools, systems, assemblies, or methods of the present disclosure to any particular industry, field, or environment.

One or more specific embodiments of the present disclosure are described herein. These described embodiments are examples of the presently disclosed techniques. Additionally, in an effort to provide a concise description of these embodiments, not all features of an actual embodiment may be described in the specification. It should be appreciated that in the development of any such actual implementation, as in any engineering or design project, numerous embodiment-specific decisions will be made to achieve the developers' specific goals, such as compliance with system-related and business-related constraints, which may vary from one embodiment to another. Moreover, it should be appreciated that such a development effort might be complex and time consuming, but would nevertheless be a routine undertaking of design, fabrication, and manufacture for those of ordinary skill having the benefit of this disclosure.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element described in relation to an embodiment herein may be combinable with any element of any other embodiment described herein. Numbers, percentages, ratios, or other values stated herein are intended to include that value, and also other values that are "about" or "approximately" the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing or production process, and may include values that are within 5%, within 1%, within 0.1%, or within 0.01% of a stated value.

A person having ordinary skill in the art should realize in view of the present disclosure that equivalent constructions do not depart from the spirit and scope of the present disclosure, and that various changes, substitutions, and alterations may be made to embodiments disclosed herein without departing from the spirit and scope of the present disclosure. Equivalent constructions, including functional "means-plus-function" clauses are intended to cover the structures described herein as performing the recited function, including both structural equivalents that operate in the same manner, and equivalent structures that provide the same function. It is the express intention of the applicant not to invoke means-plus-function or other functional claiming for any claim except for those in which the words 'means for' appear together with an associated function. Each addition, deletion, and modification to the embodiments that falls within the meaning and scope of the claims is to be embraced by the claims.

The terms "approximately," "about," and "substantially" as used herein represent an amount close to the stated amount that still performs a desired function or achieves a desired result. For example, the terms "approximately," "about," and "substantially" may refer to an amount that is within less than 5% of, within less than 1% of, within less than 0.1% of, and within less than 0.01% of a stated amount. Further, it should be understood that any directions or reference frames in the preceding description are merely relative directions or movements. For example, any references to "up" and "down" or "above" or "below" are merely descriptive of the relative position or movement of the related elements.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A downhole turbine, comprising:

a hub comprising a wall, the wall comprising an inner surface, an outer surface, and an opening extending from the outer surface to the inner surface; and a fin coupled to the hub, the fin comprising a first portion and a second portion, wherein:

the first portion is disposed on the outer surface and comprises a leading edge of the fin and a hub locking feature;

the second portion comprises a trailing edge of the fin, a backing, a locating feature, and a fin locking feature, wherein:

the fin locking feature is disposed in the hub locking feature;

the locating feature is disposed in the opening and engaged with a surface of the opening;

the backing is engaged with the inner surface; and the trailing edge of the fin is movable relative to the backing; and the second portion is changeable between a first exit angle and a second exit angle, the first exit angle and the second exit angle being different.

2. The downhole turbine of claim 1, wherein the second portion of the fin being changeable between a first state and a second state, wherein the first state comprises the first exit angle and the second state comprises the second exit angle.

3. The downhole turbine of claim 1, the second portion being fabricated from an elastically deformable material, a first state being a neutral shape.

4. The downhole turbine of claim 1, wherein a difference between the first exit angle and the second exit angle is less than 60°.

5. The downhole turbine of claim 1, wherein the leading edge is elastically deformable.

6. The downhole turbine of claim 1, wherein the second portion is fabricated from at least one of an elastomer material, a hydrogenated nitrile butadiene, a fluroelastomer, a spring steel, or a cobalt-chromium alloy.

7. A downhole turbine, comprising:

a hub comprising a wall, the wall comprising an inner surface, an outer surface, and an opening extending from the outer surface to the inner surface; and a fin comprising:

a first portion disposed on the outer surface and comprises a leading edge of the fin and a hub locking feature; and a second portion comprising a fin locking feature, a backing, a locating feature, and a tip of the fin, wherein:

the fin locking feature is disposed in the hub locking feature of the first portion;

the locating feature is disposed in the opening and engaged with a surface of the opening;

the backing is engaged with the inner surface; and the tip is movable relative to the backing and the hub.

8. The downhole turbine of claim 7, wherein the tip deflects in response to a fluid flow across the fin.

9. The downhole turbine of claim 7, wherein the tip comprises a trailing edge elastically deformable in response to a fluid flow.

10. The downhole turbine of claim 7, wherein the fin is movable between a first state and a second state, the first state being a neutral position.

11. The downhole turbine of claim 7, wherein the first portion is integrally formed with the hub.

12. The downhole turbine of claim 7, the leading edge being fabricated from steel or tungsten carbide.

13. The downhole turbine of claim 7, the second portion being inserted through the opening of the hub from an inner bore of the hub to dispose the fin locking feature into the hub locking feature, the inner bore defined by the inner surface of the wall of the hub.

14. The downhole turbine of claim 7, wherein the leading edge is elastically deformable.

15. The downhole turbine of claim 7, wherein the second portion is fabricated from at least one of an elastomer material, a hydrogenated nitrile butadiene, a fluroelastomer, a spring steel, or a cobalt-chromium alloy.

16. A method for regulating torque, comprising:

flowing a fluid across a fin in a first state coupled to a hub, the hub comprising a wall, an outer surface, an inner surface, and an opening extending from the outer surface to the inner surface, the fluid comprising a fluid property, the fin comprising:

a first portion disposed on the outer surface and comprising a leading edge of the fin and a hub locking feature; and a second portion comprising a trailing edge of the fin, a backing, a locating feature, and a fin locking feature, wherein:

the trailing edge comprises a first exit angle when the fin is in the first state;

the fin locking feature is disposed in the hub locking feature;

the locating feature is disposed in the opening and engaged with a surface of the opening;

the backing is engaged with the inner surface; and the trailing edge is movable relative to the backing; and rotating the hub with a first torque based at least in part on the first exit angle;

changing the fluid property;

changing the fin from the first state to a second state in response to changing the fluid property, wherein the trailing edge comprises a second exit angle when the fin is in the second state; and rotating the hub with a second torque based at least in part on the second exit angle.

17. The method of claim 16, wherein rotating the hub with the first torque comprises rotating the hub with a rotational rate of less than 400 rotations per minute (RPM).

18. The method of claim 16, wherein rotating the hub with the second torque comprises limiting the second torque to less than a target torque.

19. The method of claim 16, wherein changing the fluid property comprises changing at least one of density, velocity, volumetric flow rate, or viscosity.

* * * * *